(12) United States Patent
Hamilton, Jr. et al.

(10) Patent No.: US 7,855,740 B2
(45) Date of Patent: Dec. 21, 2010

(54) MULTIPLE COMPONENT READOUT OF IMAGE SENSOR

(75) Inventors: John F. Hamilton, Jr., Rochester, NY (US); John T. Compton, LeRoy, NY (US)

(73) Assignee: Eastman Kodak Company, Rochester, NY (US)

( * ) Notice: Subject to any disclaimer, the term of this patent is extended or adjusted under 35 U.S.C. 154(b) by 695 days.

(21) Appl. No.: 11/780,523

(22) Filed: Jul. 20, 2007

(65) Prior Publication Data

US 2009/0021612 A1 Jan. 22, 2009

(51) Int. Cl.
*H04N 9/083* (2006.01)
*H04N 3/14* (2006.01)
*H04N 5/335* (2006.01)
*H04N 9/04* (2006.01)

(52) U.S. Cl. .................. 348/273; 348/266; 348/276

(58) Field of Classification Search .............. 348/273, 348/276, 266
See application file for complete search history.

(56) References Cited

U.S. PATENT DOCUMENTS

| | | | |
|---|---|---|---|
| 3,971,065 A | 7/1976 | Bayer | |
| 4,246,601 A | 1/1981 | Sato et al. | |
| 4,390,895 A | 6/1983 | Sato et al. | |
| 4,479,242 A | 10/1984 | Kurata | |
| 5,323,233 A | 6/1994 | Yamagami et al. | |
| 5,773,814 A | 6/1998 | Phillips et al. | |
| 6,115,065 A | 9/2000 | Yadid-Pecht et al. | |
| 6,476,865 B1 | 11/2002 | Gindele et al. | |
| 6,829,008 B1* | 12/2004 | Kondo et al. | 348/302 |
| 6,999,119 B1* | 2/2006 | Shibazaki et al. | 348/273 |
| 7,099,056 B1* | 8/2006 | Kindt | 358/509 |
| 2006/0274171 A1* | 12/2006 | Wang | 348/294 |
| 2007/0024931 A1 | 2/2007 | Compton et al. | |
| 2007/0046807 A1 | 3/2007 | Hamilton, Jr. et al. | |

* cited by examiner

*Primary Examiner*—David L Ometz
*Assistant Examiner*—Antoinette T Spinks
(74) *Attorney, Agent, or Firm*—Raymond L. Owens

(57) ABSTRACT

A method for obtaining image data from an image sensor array including the steps of: providing an image sensor array having a first component subset of panchromatic pixels for integrating charge and a second component subset of color pixels for integrating charge; reading pixel charge to produce pixel signals from the first component subset of the panchromatic pixels while exposing the second component subset of color pixels and digitizing and storing the first component subset signals; and reading pixel charge to produce pixel signals from the second component subset of color pixels that were exposed for at least a portion of time during the reading of pixel signals from the first component subset of the panchromatic pixels and digitizing and storing the second component subset signals.

13 Claims, 18 Drawing Sheets

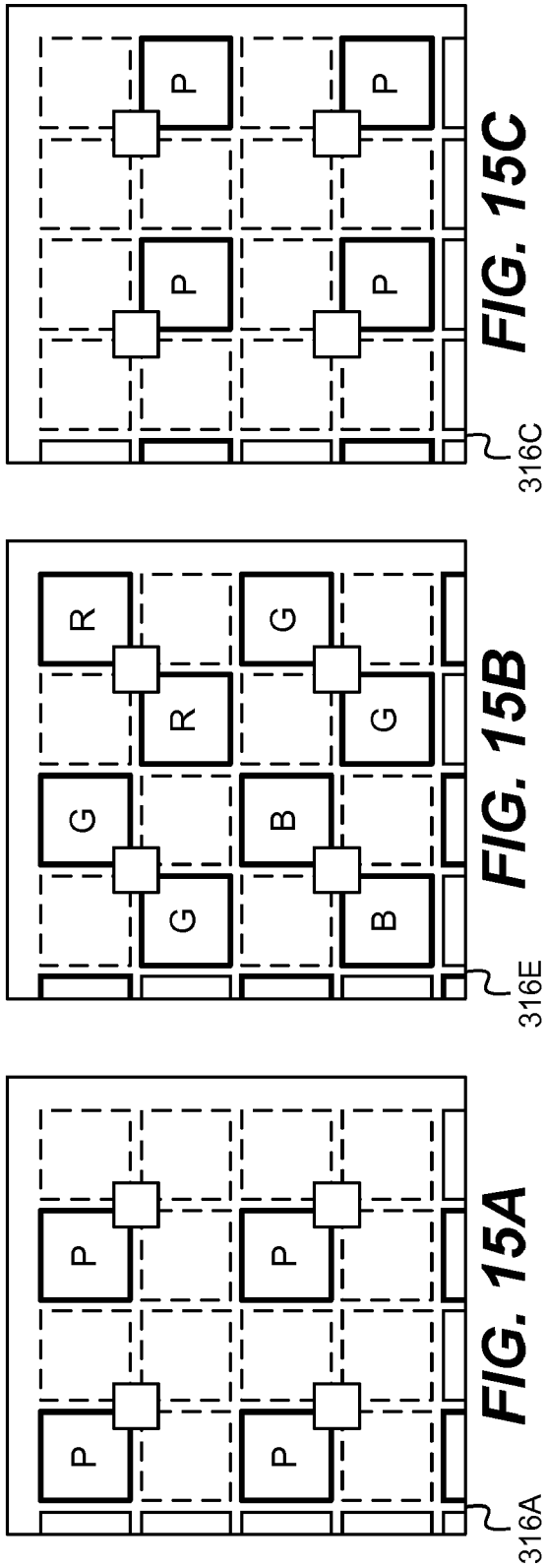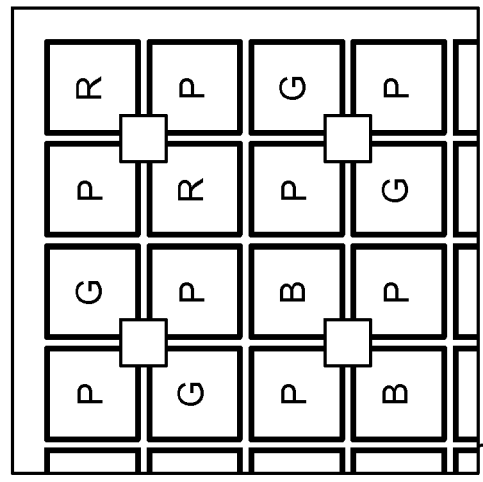

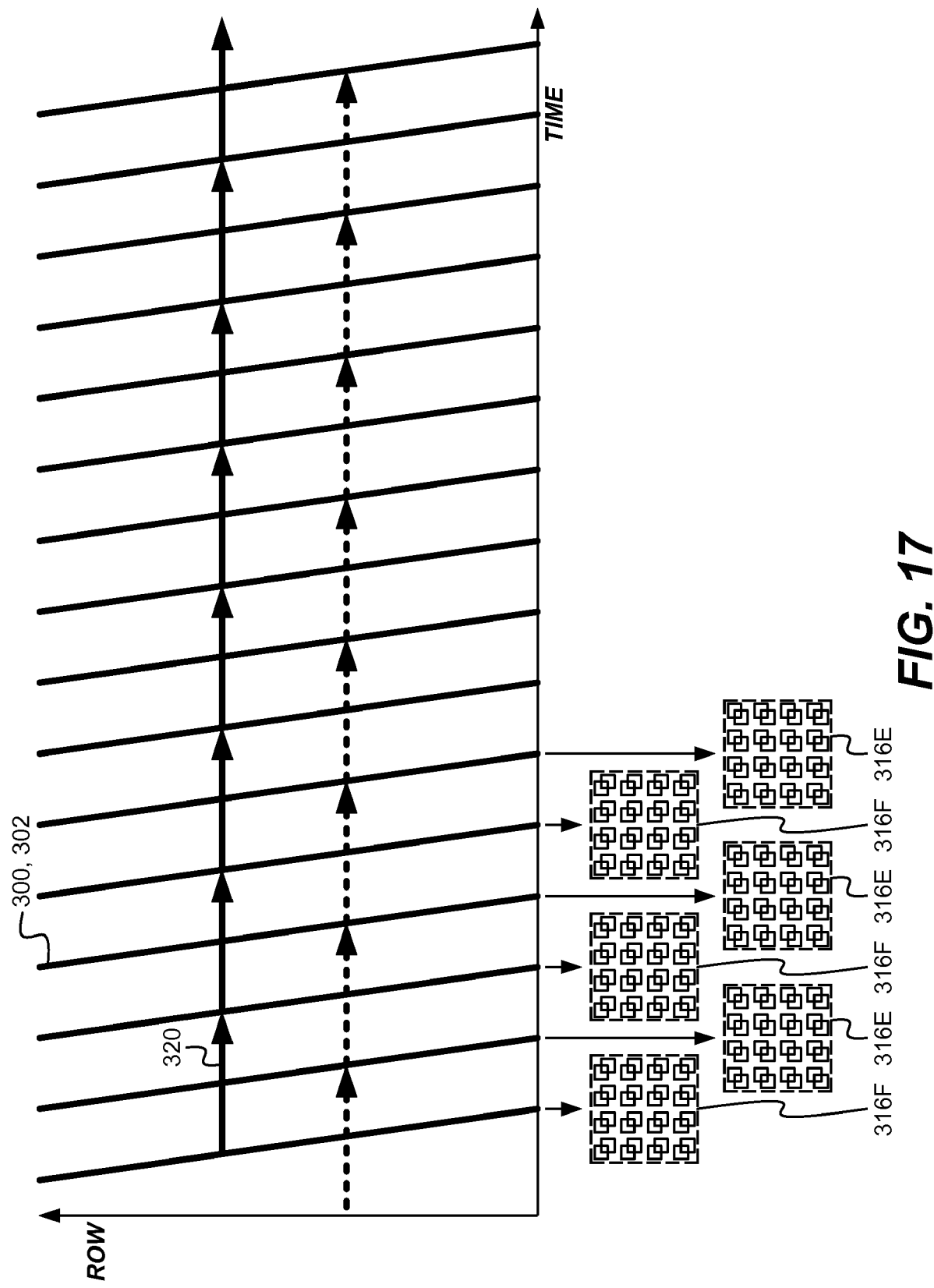

MULTIPLE COMPONENT READOUT OF IMAGE SENSOR

FIELD OF THE INVENTION

The present invention relates to electronic image capture systems and more particularly relates to a system having an image sensor with both color and panchromatic pixels and that uses a multi-component readout of the image sensor.

BACKGROUND OF THE INVENTION

An electronic imaging system depends on an electronic image sensor to create an electronic representation of a visual image. Examples of such electronic image sensors include charge coupled device (CCD) image sensors and active pixel sensor (APS) devices. APS devices are often referred to as CMOS sensors because of the ability to fabricate them in a Complementary Metal Oxide Semiconductor process. Typically, these image sensors include a number of light sensitive pixels (that is, picture elements) arranged in a regular two-dimensional pattern or array of rows and columns, with each individual pixel providing a signal based on the light level of the portion of a scene image projected onto the pixel by a lens.

For reasons of size and the needed compactness, such image sensors usually include vastly more pixels than analog to digital converters (ADC) to digitize their signals. In order to save space, it is common practice to provide only enough storage devices to simultaneously read out the pixels of a single row. Consequently, the pixel signals cannot be measured, or read out, simultaneously but must wait their turn in a serial fashion. For example, in a CCD having a single ADC, the pixel signals are read out in a raster fashion: pixel-by-pixel within a row, then row-by-row within the array of pixels. The serial nature of image sensor readout directly controls the rate at which the entire sensor can be read to the bandwidth of the readout mechanism. If the read out mechanism of the image sensor can measure 50 million pixels per second, then it must take one-tenth of a second to read out a 5 megapixel image sensor. Reducing the time required to read the entire image sensor generally requires increasing power consumption for faster read out, or increasing size of the image sensor for additional read out channels. Neither increased power consumption nor increased size is desirable.

Because it eliminates mechanical components and reduces cost and space requirements, it is common practice to build an image capture system having no light blocking shutter. Such systems rely instead on an electronic shutter that works by resetting each photosensor, integrating photo-electrons, and then reading out the photosensor signal. The reset step can be accomplished by transferring residual charge from a photodiode to associated floating diffusion circuitry and then discarding the residual charge. The photo-electrons then begin accumulating in the photodiode for the prescribed integration time, at which point the charge is transferred into the floating diffusion and, in CMOS devices, is converted to a voltage. The associated voltage is then stored in a memory device such as a capacitor.

If the sensor has sufficiently low dark current and sufficiently good light shielding for the floating diffusion, then the transferred photo-electrons need not be read out immediately. Under these conditions, one can transfer the charge from all pixels at once into their respective floating diffusions and then wait for a short time as the rolling read out processed the signals row by row. Of course, for such a global transfer to work, each pixel would also need to have its own light-shielded floating diffusion.

An alternative image sensor readout arrangement, provided particularly by APS image sensors, permits exposure and readout of the image sensor to occur progressively row-by-row across the rows of the image sensor. This "rolling shutter" sequence avoids the differential exposure problem that the interlaced fields of a CCD exhibit by making the exposure for each row the same length of time.

As an additional advantage, the rolling shutter sequence simplifies sensor component design, since shielded storage is not required for each pixel. However, since the exposure for each row is independent from the exposures of the other rows and occurs in a sequential (or rolling) fashion with the exposures of the other rows, each row captures its portion of a scene image at a slightly different time.

Consequently, relative motion between the scene (or elements of the scene) and the image sensor causes objects within the scene to appear distorted in the image captured by the image sensor. This effect, termed image "shear", is characteristic of rolling shutter arrangements. For example, if such a so-called rolling shutter or electronic focal plane shutter image sensor is used to capture an image of a car moving horizontally, the car moves relative to the image sensor as each row of the captured image is exposed and read out, so each row of the captured image shows the car at a different position. This can cause the round tires of the car to appear oval, and the car's rectangular windows to appear to be parallelograms. This distortion is a direct consequence of the amount of time required to read out all the rows of the image sensor. If the rows can be read at a faster rate, then this distortion can be reduced. As noted previously, however, increasing the readout rate generally requires an increase in cost and power consumption for the image sensor.

For silicon-based image sensors, the pixels themselves are broadly sensitive to visible light, permitting unfiltered pixels to be suitable for capturing a monochrome image. For capturing color images, a two-dimensional pattern of filters is typically fabricated on the pattern of pixels, with different filter materials used to make individual pixels sensitive to only a portion of the visible light spectrum. An example of such a pattern of filters is the well-known Bayer color filter array (CFA) pattern, as described in U.S. Pat. No. 3,971,065. Though the Bayer CFA has advantages for obtaining full color images under typical conditions, however, this solution has been found to have its drawbacks. Filtering to provide narrow-band spectral response tends to reduce the amount of light reaching each pixel, thereby reducing the light sensitivity of each pixel and reducing pixel response speed.

As solutions for improving image capture under varying light conditions and for improving overall sensitivity of the imaging sensor, modifications to the familiar Bayer pattern have been disclosed. For example, commonly assigned U.S. Patent Applications Publication No. 2007/0046807 entitled "Capturing Images Under Varying Lighting Conditions" by Hamilton et al. and Publication No. 2007/0024931 entitled "Image Sensor with Improved Light Sensitivity" by Compton et al. both describe alternative sensor arrangements that combine color filters with panchromatic filter elements, interleaved in some manner. With this type of solution, some portion of the image sensor detects color; the other panchromatic portion is optimized to detect light spanning the visible band for improved dynamic range and sensitivity. These solutions thus provide a pattern of pixels, some pixels with color filters (providing a narrow-band spectral response) and some without (unfiltered pixels or pixels filtered to provide a broad-band spectral response).

Using a combination of both narrow- and wide-spectral band pixel responses, image sensors can be used at lower light levels or provide shorter exposure times. See Sato et al in U.S. Pat. No. 4,390,895, Yamagami et al in U.S. Pat. No. 5,323,233, and Gindele et al in U.S. Pat. No. 6,476,865.

Even though image sensors that employ narrow-band and broadband color filters can provide improved light sensitivity or photographic speed, some problems and limitations persist. Interline CCDs used in digital still cameras generally employ a mechanical light blocking shutter during readout to avoid charge blooming in bright areas of the scene or to accommodate an interlaced vertical CCD. Consequently, the shutter open and close times must be considered when capturing a sequence of images, necessarily limiting exposure time and sequence image capture rate. As for CMOS APS devices, rolling shutter artifacts appear even where reading speed is increased over conventional timing methods.

Thus, it can be seen that there is a need for improved readout methods that yield faster pixel response times and thus reduce motion-related aberrations, without compromising overall color sensing performance.

SUMMARY OF THE INVENTION

In accordance with the present invention, there is provided a method for obtaining image data from an image sensor array including the steps of providing an image sensor array having a first component subset of panchromatic pixels for integrating charge and a second component subset of color pixels for integrating charge; reading pixel charge to produce pixel signals from the first component subset of the panchromatic pixels while exposing the second component subset of color pixels and digitizing and storing the first component subset signals; and reading pixel charge to produce pixel signals from the second component subset of color pixels that were exposed for at least a portion of time during the reading of pixel signals from the first component subset of the panchromatic pixels and digitizing and storing the second component subset signals.

Image capture systems in accordance with the present invention are particularly suitable for image capture devices that capture still and video images. The present invention has a broad application and numerous types of image capture devices can effectively use these image capture systems.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 (prior art) is conventional Bayer color filter array pattern showing a minimal repeating unit and a non-minimal repeating unit;

FIG. 5 is a plan view showing a number of patterns for pixel arrangements where both color and panchromatic pixels are used;

FIG. 15A shows a readout arrangement for reading out a panchromatic component using a shared or common storage element;

FIG. 15B shows a readout arrangement for reading out a color component with charge from color pixels binned pairwise using a shared or common storage element;

FIG. 15C shows a readout arrangement for reading out an alternate panchromatic component using a shared or common storage element;

FIG. 15D shows a readout arrangement for reading out a panchromatic component with charge from panchromatic pixels binned pairwise using a shared or common storage element;

FIG. 15E shows a readout arrangement for reading out a pixel array using a shared or common storage element in which panchromatic and color pixels are binned together;

FIG. 17 is a timing diagram showing rolling shutter operation for reading two components in which both of the components include binned pixels.

DETAILED DESCRIPTION OF THE INVENTION

Because digital cameras employing imaging devices and related circuitry for signal capture and correction and for exposure control are well known, the present description will be directed in particular to elements forming part of, or cooperating more directly with, method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

In the context of the present disclosure, the term "partition" has the meaning used in mathematical set theory. A partition of a set S is a collection of disjoint proper, non-empty subsets whose union is the complete set S. It can be observed that this definition differs somewhat in connotation from casual use of the term. However, the definition assigned by mathematical set theory is particularly appropriate for defining how pixels in an array are organized using the method and apparatus of the present invention, as is described in more detail subsequently.

The term "subset", when not otherwise modified, is used herein to refer to a non-empty subset and, for a set S, may comprise the complete set S. A "proper subset" of set S, however, is strictly contained in set S and excludes at least one member of set S. Two subsets are disjoint if their intersection is the empty set, that is, they have no elements in common.

Figure 1:
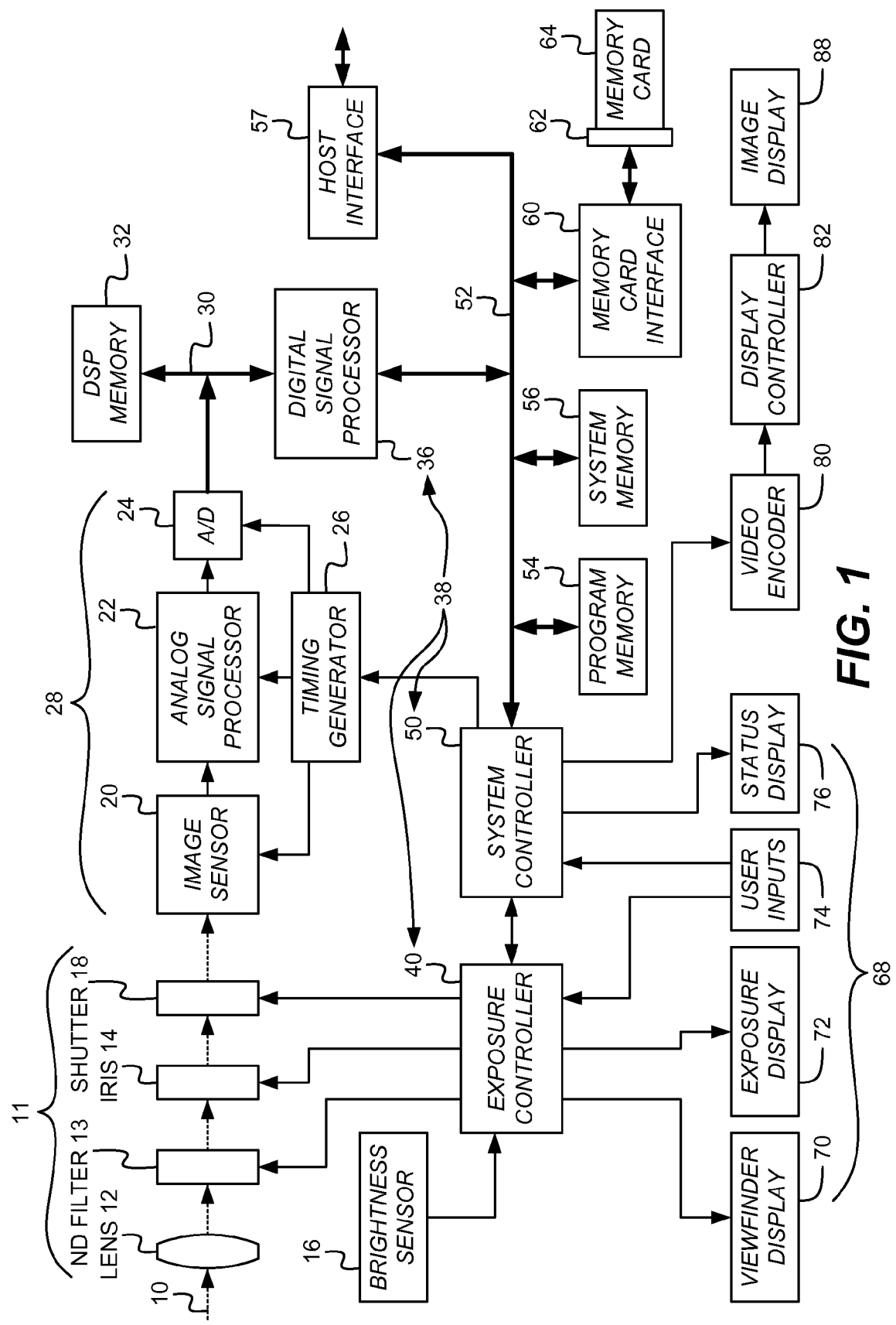
FIG. 1 is a block diagram of a conventional digital still camera system that can employ a conventional sensor and processing methods or the sensor and processing methods of the current invention.

Turning now to FIG. 1, a block diagram of an image capture device shown as a digital camera embodying the present invention is shown. Although a digital camera will now be explained, the present invention is clearly applicable to other types of image capture devices, such as on imaging subsystems included in non-camera devices such as mobile phones and automotive vehicles, for example. Light 10 from the subject scene is input to an imaging stage 11, where the light is focused by lens 12 to form an image on solid-state image sensor 20. Image sensor 20 converts the incident light to an electrical signal by integrating charge for each picture element (pixel). The image sensor 20 of the preferred embodiment is a charge coupled device (CCD) type or an active pixel sensor (APS) type. (APS devices are often referred to as CMOS sensors because of the ability to fabricate them in a Complementary Metal Oxide Semiconductor process). The sensor includes an arrangement of color filters, as described in more detail subsequently.

The amount of light reaching the sensor 20 is regulated by an iris block 14 that varies the aperture and the neutral density (ND) filter block 13 that includes one or more ND filters interposed in the optical path. Also regulating the overall light level is the time that the shutter block 18 is open. The exposure controller block 40 responds to the amount of light available in the scene as metered by the brightness sensor block 16 and controls all three of these regulating functions.

The analog signal from image sensor 20 is processed by analog signal processor 22 and applied to analog to digital (A/D) converter 24 for digitizing the sensor signals. Timing generator 26 produces various clocking signals to select rows and pixels and synchronizes the operation of analog signal processor 22 and A/D converter 24. The image sensor stage 28 includes the image sensor 20, the analog signal processor 22, the A/D converter 24, and the timing generator 26. The functional elements of image sensor stage 28 are separately fabricated integrated circuits, or they are fabricated as a single integrated circuit as is commonly done with CMOS image sensors. The resulting stream of digital pixel values from A/D converter 24 is stored in memory 32 associated with digital signal processor (DSP) 36.

Digital signal processor 36 is one of three processors or controllers in this embodiment, in addition to system controller 50 and exposure controller 40. Although this distribution of camera functional control among multiple controllers and processors is typical, these controllers or processors are combined in various ways without affecting the functional operation of the camera and the application of the present invention. These controllers or processors can comprise one or more digital signal processor devices, microcontrollers, programmable logic devices, or other digital logic circuits. Although a combination of such controllers or processors has been described, it should be apparent that one controller or processor is designated to perform all of the needed functions. All of these variations can perform the same function and fall within the scope of this invention, and the term "processing stage" will be used as needed to encompass all of this functionality within one phrase, for example, as in processing stage 38 in FIG. 1.

In the illustrated embodiment, DSP 36 manipulates the digital image data in its memory 32 according to a software program permanently stored in program memory 54 and copied to memory 32 for execution during image capture. DSP 36 executes the software needed for practicing image processing shown in FIG. 18. Memory 32 includes of any type of random access memory, such as SDRAM. A bus 30 comprising a pathway for address and data signals connects DSP 36 to its related memory 32, A/D converter 24 and other related devices.

System controller 50 controls the overall operation of the camera based on a software program stored in program memory 54, which can include Flash EEPROM or other nonvolatile memory. This memory can also be used to store image sensor calibration data, user setting selections and other data which must be preserved when the camera is turned off. System controller 50 controls the sequence of image capture by directing exposure controller 40 to operate the lens 12, ND filter 13, iris 14, and shutter 18 as previously described, directing the timing generator 26 to operate the image sensor 20 and associated elements, and directing DSP 36 to process the captured image data. After an image is captured and processed, the final image file stored in memory 32 is transferred to a host computer via interface 57, stored on a removable memory card 64 or other storage device, and displayed for the user on image display 88.

A bus 52 includes a pathway for address, data and control signals, and connects system controller 50 to DSP 36, program memory 54, system memory 56, host interface 57, memory card interface 60 and other related devices. Host interface 57 provides a high-speed connection to a personal computer (PC) or other host computer for transfer of image data for display, storage, manipulation or printing. This interface is an IEEE1394 or USB2.0 serial interface or any other suitable digital interface. Memory card 64 is typically a Compact Flash (CF) card inserted into socket 62 and connected to the system controller 50 via memory card interface 60. Other types of storage that are utilized include without limitation PC-Cards, MultiMedia Cards (MMC), or Secure Digital (SD) cards.

Processed images are copied to a display buffer in system memory 56 and continuously read out via video encoder 80 to produce a video signal. This signal is output directly from the camera for display on an external monitor, or processed by display controller 82 and presented on image display 88. This display is typically an active matrix color liquid crystal display (LCD), although other types of displays are used as well.

The user interface 68, including all or any combination of viewfinder display 70, exposure display 72, status display 76 and image display 88, and user inputs 74, is controlled by a combination of software programs executed on exposure controller 40 and system controller 50. User inputs 74 typically include some combination of buttons, rocker switches, joysticks, rotary dials or touchscreens. Exposure controller 40 operates light metering, exposure mode, autofocus and other exposure functions. The system controller 50 manages the graphical user interface (GUI) presented on one or more of the displays, e.g., on image display 88. The GUI typically includes menus for making various option selections and review modes for examining captured images.

Exposure controller 40 accepts user inputs selecting exposure mode, lens aperture, exposure time (shutter speed), and exposure index or ISO speed rating and directs the lens and shutter accordingly for subsequent captures. Brightness sensor 16 is employed to measure the brightness of the scene and provide an exposure meter function for the user to refer to when manually setting the ISO speed rating, aperture and shutter speed. In this case, as the user changes one or more settings, the light meter indicator presented on viewfinder display 70 tells the user to what degree the image will be over or underexposed. In an automatic exposure mode, the user changes one setting and the exposure controller 40 automatically alters another setting to maintain correct exposure, e.g., for a given ISO speed rating when the user reduces the lens aperture the exposure controller 40 automatically increases the exposure time to maintain the same overall exposure.

The ISO speed rating is an important attribute of a digital still camera. The exposure time, the lens aperture, the lens transmittance, the level and spectral distribution of the scene illumination, and the scene reflectance determine the exposure level of a digital still camera. When an image from a digital still camera is obtained using an insufficient exposure, proper tone reproduction can generally be maintained by increasing the electronic or digital gain, but the image will contain an unacceptable amount of noise. As the exposure is increased, the gain is decreased, and therefore the image noise can normally be reduced to an acceptable level. If the exposure is increased excessively, the resulting signal in bright areas of the image can exceed the maximum signal level capacity of the image sensor or camera signal processing. This can cause image highlights to be clipped to form a uniformly bright area, or to bloom into surrounding areas of the image. It is important to guide the user in setting proper exposures. An ISO speed rating is intended to serve as such a guide. In order to be easily understood by photographers, the ISO speed rating for a digital still camera should directly relate to the ISO speed rating for photographic film cameras. For example, if a digital still camera has an ISO speed rating of ISO 200, then the same exposure time and aperture should be appropriate for an ISO 200 rated film/process system.

The ISO speed ratings are intended to harmonize with film ISO speed ratings. However, there are differences between electronic and film-based imaging systems that preclude exact equivalency. Digital still cameras can include variable gain, and can provide digital processing after the image data has been captured, enabling tone reproduction to be achieved over a range of camera exposures. Because of this flexibility, digital still cameras can have a range of speed ratings. This range is defined as the ISO speed latitude. To prevent confusion, a single value is designated as the inherent ISO speed rating, with the ISO speed latitude upper and lower limits indicating the speed range, that is, a range including effective speed ratings that differ from the inherent ISO speed rating. With this in mind, the inherent ISO speed is a numerical value calculated from the exposure provided at the focal plane of a digital still camera to produce specified camera output signal characteristics. The inherent speed is usually the exposure index value that produces peak image quality for a given camera system for normal scenes, where the exposure index is a numerical value that is inversely proportional to the exposure provided to the image sensor.

The foregoing description of a digital camera will be familiar to one skilled in the art. It will be obvious that there are many variations of this embodiment that can be selected to reduce the cost, add features, or improve the performance of the camera. For example, an autofocus system is added, or the lens is detachable and interchangeable. It will be understood that the present invention is applied to any type of digital camera or, more generally, digital image capture apparatus, where alternative modules provide similar functionality.

Given the illustrative example of FIG. 1, the following description will then describe in detail the operation of this camera for capturing images according to the present invention. Whenever general reference is made to an image sensor in the following description, it is understood to be representative of the image sensor 20 from FIG. 1. Image sensor 20 shown in FIG. 1 typically includes a two-dimensional array of light sensitive pixels fabricated on a silicon substrate that convert incoming light at each pixel into an electrical signal that is measured. In the context of an image sensor, a pixel (a contraction of "picture element") refers to a discrete light sensing area and charge shifting or charge measurement circuitry associated with the light sensing area. In the context of a digital color image, the term pixel commonly refers to a particular location in the image having associated color values. The term color pixel will refer to a pixel having a color photoresponse over a relatively narrow spectral band.

As sensor 20 is exposed to light, free electrons are generated and captured within the electronic structure at each pixel. Capturing these free electrons for some period of time and then measuring the number of electrons captured, or measuring the rate at which free electrons are generated, can measure the light level at each pixel. In the former case, accumulated charge is shifted out of the array of pixels to a charge-to-voltage measurement circuit as in a charge-coupled device (CCD), or the area close to each pixel can contain elements of a charge-to-voltage measurement circuit as in an active pixel sensor (APS or CMOS sensor).

Figure 2:
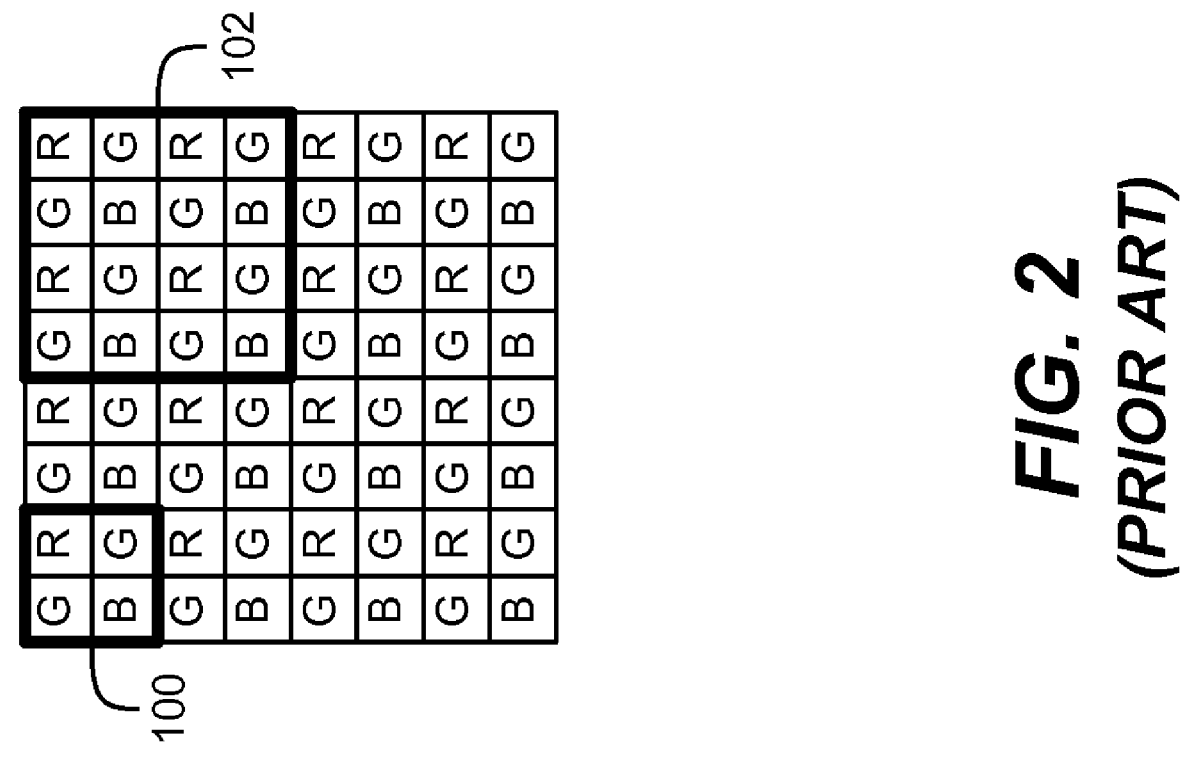

In order to produce a color image, the array of pixels in an image sensor typically has a pattern of color filters placed over them. FIG. 2 shows a pattern of red (R), green (G), and blue (B) color filters that is commonly used. This particular pattern is commonly known as a Bayer color filter array (CFA) after its inventor Bryce Bayer as disclosed in U.S. Pat. No. 3,971,065. This pattern is effectively used in image sensors having a two-dimensional array of color pixels. As a result, each pixel has a particular color photoresponse that, in this case, is a predominant sensitivity to red, green or blue light. Another useful variety of color photoresponses is a predominant sensitivity to magenta, yellow, or cyan light. In each case, the particular color photoresponse has high sensitivity to certain portions of the visible spectrum, while simultaneously having low sensitivity to other portions of the visible spectrum.

A minimal repeating unit is a repeating unit such that no other repeating unit has fewer pixels. For example, the CFA in FIG. 2 includes a minimal repeating unit that is two pixels by two pixels as shown by pixel block 100 in FIG. 2, which can be expressed as:

$$\begin{array}{cc} G & R \\ B & G \end{array}$$

Multiple copies of this minimal repeating unit are tiled to cover the entire array of pixels in an image sensor. The minimal repeating unit is shown with a green pixel in the upper right corner, but three alternative minimal repeating units can easily be discerned by moving the heavy outlined area one pixel to the right, one pixel down, or one pixel diagonally to the right and down. Although pixel block 102 is a repeating unit, it is not a minimal repeating unit because pixel block 100 is a repeating unit and block 100 has fewer pixels than block 102.

An image captured using an image sensor having a two-dimensional array with the CFA of FIG. 2 has only one color value at each pixel. In order to produce a full color image, there are a number of techniques for inferring or interpolating the missing colors at each pixel. These CFA interpolation techniques are well known in the art and reference is made to the following patents: U.S. Pat. No. 5,506,619; U.S. Pat. No. 5,629,734; and U.S. Pat. No. 5,652,621.

Each pixel of image sensor 20 has both photodetector and active transistor circuitry for readout of the pixel signal. The photodetector for each pixel in the image sensor array converts photons impinging on the pixel to an electric charge by the photoelectric effect. The charge is integrated over a period of time that is long enough to collect a detectable amount of charge but short enough to avoid saturating storage elements. This integration time period is analogous to a film exposure time (that is, shutter speed).

The timing of image capture can follow one of two basic patterns. In a global capture sequence, all image pixels are simply read at the same time. However, this type of sequence requires considerable device complexity and can be disadvantageous because it constrains the amount of space on the sensor chip for photo-receptivity. Instead, a row-by-row reading method has been adopted and is often the preferred mode of reading for CMOS APS pixels.

In the image sensor array of a CMOS APS device, the integration time is the time between a reset of a given row and a subsequent read of the row. Since only one row can be selected at a time, the reset/read routine is sequential (i.e. row by row). This reading technique is referred to as a "rolling electronic shutter" or, more simply, "rolling shutter" mode and is well known in the imaging art. A few examples of variations on rolling shutter time sequencing are given in U.S. Pat. No. 6,115,065 entitled "Image Sensor Producing at Least Two Integration Times from Each Sensing Pixel" to Yadid-Pecht et al. and in U.S. Pat. No. 6,809,766 entitled "Look-Ahead Rolling Shutter System in CMOS Sensors" to Krymski et al. The shutter width for the read sequence is the time between integration enable and readout. This can be of variable size depending on the number of adjacent pixels that have the same integration time. The shutter width, as having one or more rows read at a time, can also be adjusted by a fixed value to control the gain of an exposed area of a sensor array. As one method for rolling shutter sequencing, a reset pointer is indexed ahead of a read pointer by an amount equal to the shutter width. The time difference between the two pointers corresponds to the pixel integration time. As described above, the shutter width is completely analogous to the width of the physical opening between the two curtains of a mechanical focal plane shutter.

Figure 3A:
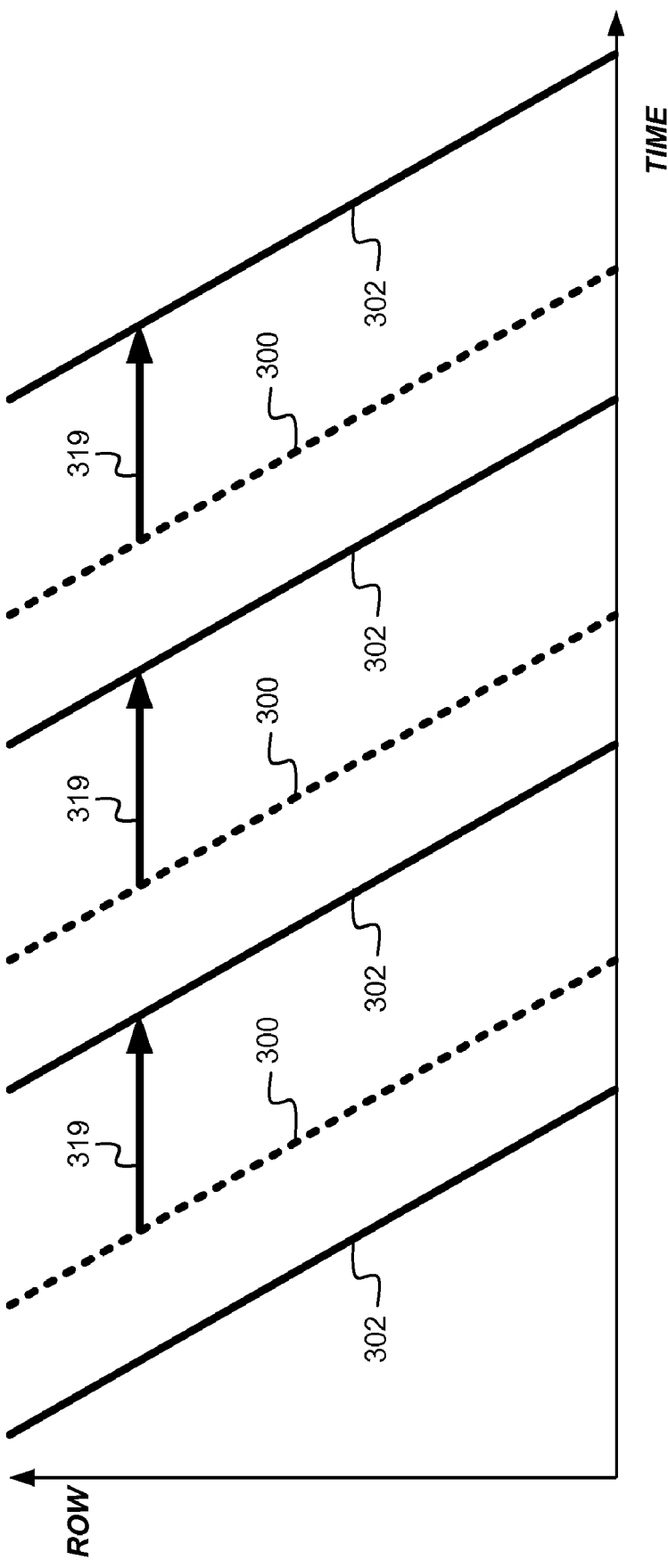
FIGS. 3A and 3B (prior art) show timing diagrams for rolling shutter operation under various light conditions.

FIG. 3A shows a timing sequence for the rolling shutter mode as conventionally used under conditions of relatively good illumination. The abscissa (x-axis) represents time. The ordinate (y-axis) represents rows being read out of the image sensor. Each solid slanted line 302 represents reading out all the rows of the image sensor in sequence, starting with the highest numbered rows and proceeding to the lowest numbered rows. (Alternatively, the lines representing readout can be slanted upward from left to right to indicate reading out the rows from lowest numbered rows to highest.) Each dashed line 300 represents resetting all the rows of the image sensor in sequence, again starting with the highest numbered rows and proceeding to the lowest numbered rows, with the entire reset process requiring exactly as much time as the readout process. The delay between a reset process 300 and its immediately following readout process 302 is the integration time for the pixels, as indicated by the solid arrows 319. Note that the integration time is constant for every row read out, but the integration period for each row is time shifted with respect to the preceding and following rows.

Figure 3B:
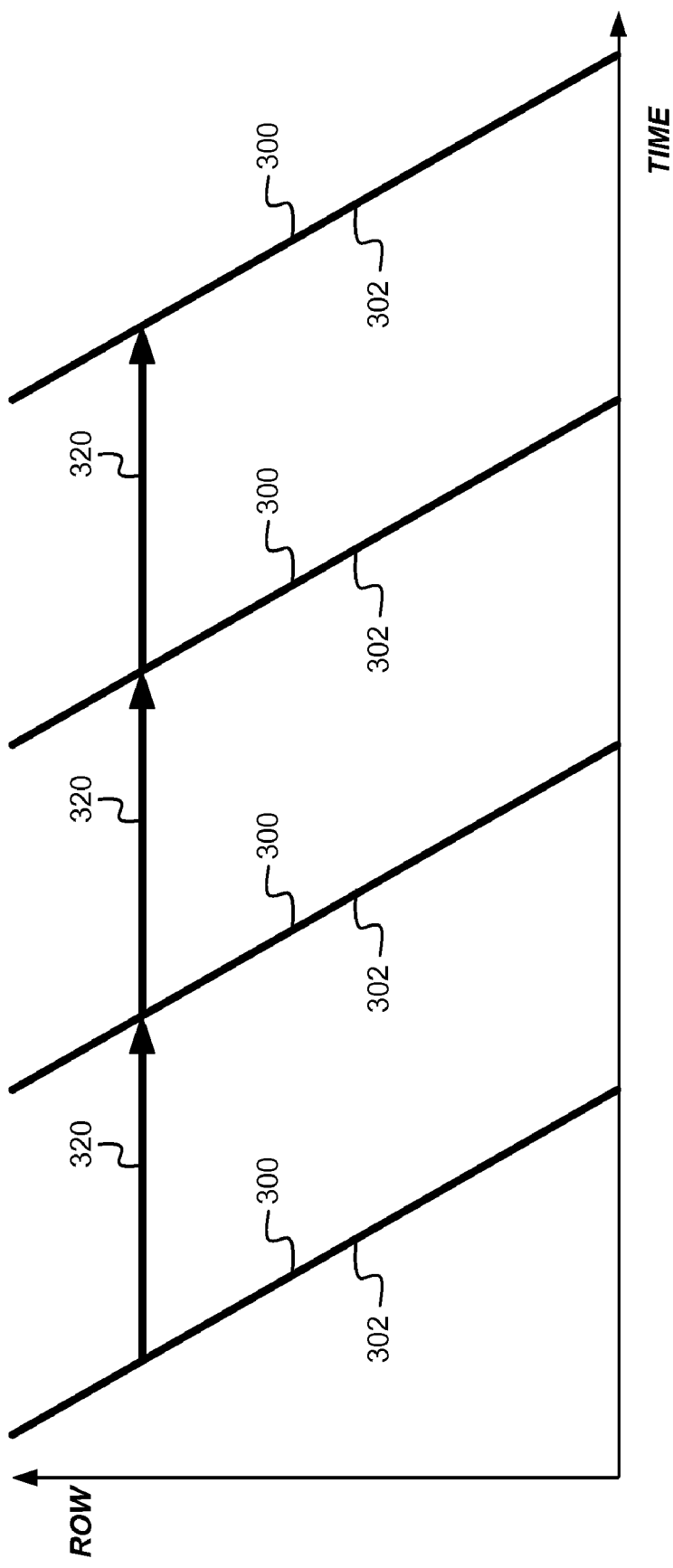

As can be seen from the timing diagram of FIG. 3A, this simple rolling shutter sequence permits periods during which no photons are obtained, specifically, between a read 302 and its immediately following reset 300. Although this can be acceptable under good illumination, this arrangement may not perform well under low-light conditions. This is because more pixel integration time may be needed as light intensity decreases. The timing diagram of FIG. 3B shows timing for low-light conditions wherein the reset 300 is performed immediately following or coincident with read 302. As a result, the pixel integration time has been increased to fill the time between successive reads and very few photons are wasted.

Even with the adoption of rolling shutter techniques, however, the task of reading the image sensor efficiently still has its shortcomings. Shear motion artifacts are one type of problem, as noted earlier. Low-light performance can still be improved. And image dynamic range can still be less than what is desired.

One type of solution that has been proposed is the use of some portion of sensor array pixels as panchromatic pixels. For example, commonly assigned U.S. Patent Application No. 2007/0024931 entitled "Image Sensor with Improved Light Sensitivity" by Compton et al. discloses an image sensor having both color and panchromatic pixels. In the context of the present disclosure, the term panchromatic pixel refers to a pixel having a generally panchromatic photoresponse, with a wider spectral sensitivity than the narrower spectral sensitivities represented in the selected set of color photoresponses. That is, a panchromatic pixel can have high sensitivity to light across the entire visible spectrum. Although the panchromatic pixels generally have a wider spectral sensitivity than the set of color photoresponses, each panchromatic pixel can also have an associated filter. Such filter can be either a neutral density filter or a color or bandwidth filter.

Figure 4:
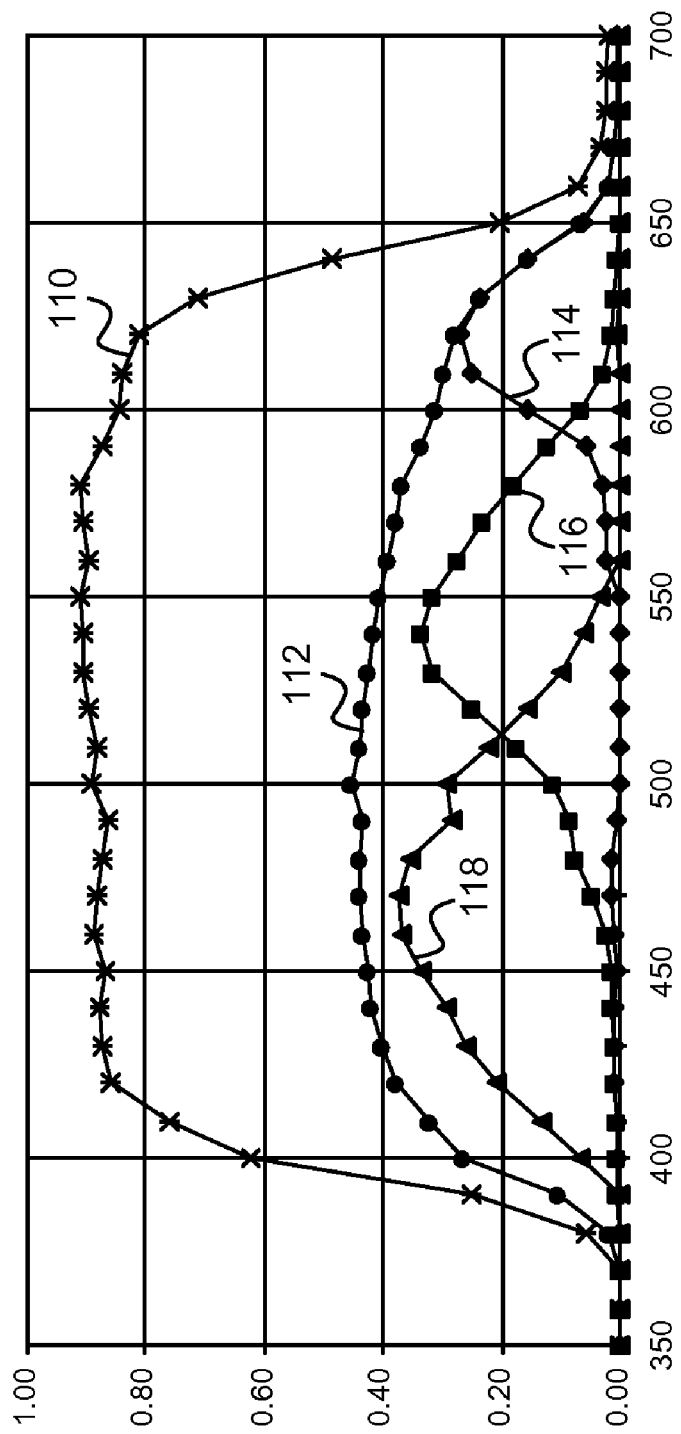
FIG. 4 provides representative spectral quantum efficiency curves for red, green, and blue pixels, as well as a wider spectrum panchromatic quantum efficiency, all multiplied by the transmission characteristics of an infrared cut filter.

Referring to the graph of FIG. 4, there are shown the relative spectral sensitivities of pixels with red, green, and blue color filters in a typical camera application. The X-axis in FIG. 4 represents light wavelength in nanometers, spanning wavelengths approximately from the near ultraviolet to near infrared, and the Y-axis represents efficiency (normalized). In FIG. 4, curve 110 represents the spectral transmission characteristic of a typical bandwidth filter used to block infrared and ultraviolet light from reaching the image sensor. Such a filter is needed because the color filters used for image sensors typically do not block infrared light, hence the pixels may be unable to distinguish between infrared light and light that is within the passbands of their associated color filters. The infrared blocking characteristic shown by curve 110 thus prevents infrared light from corrupting the visible light signal. The spectral quantum efficiency, i.e. the proportion of incident photons that are captured and converted into a measurable electrical signal, for a typical silicon sensor with red, green, and blue filters applied is multiplied by the spectral transmission characteristic of the infrared blocking filter represented by curve 110 to produce the combined system quantum efficiencies represented by curve 114 for red, curve 116 for green, and curve 118 for blue. It is understood from these curves that each color photoresponse is sensitive to only a portion of the visible spectrum. By contrast, the photoresponse of the same silicon sensor that does not have color filters applied (but including the infrared blocking filter characteristic) is shown by curve 112; this is an example of a panchromatic photoresponse. By comparing the color photoresponse curves 114, 116, and 118 to the panchromatic photoresponse curve 112, it is clear that the panchromatic photoresponse can be three to four times more sensitive to wide spectrum light than any of the color photoresponses.

Using the greater panchromatic sensitivity shown in FIG. 4, it has been found that the overall sensitivity of an image sensor can be improved by intermixing pixels that include color filters with pixels that do not include color filters. However, as seen from FIG. 4, the color filter pixels are significantly less sensitive than the panchromatic pixels. In this situation, if the panchromatic pixels are properly exposed to light such that the range of light intensities from a scene cover the full measurement range of the panchromatic pixels, then the color pixels will be significantly underexposed. Hence, it is advantageous to adjust the sensitivity of the color filter pixels so that they have roughly the same sensitivity as the panchromatic pixels. The sensitivities of the color pixels are increased, for example, by increasing the size of the color pixels relative to the panchromatic pixels, with an associated reduction in spatial pixels.

Figure 5:
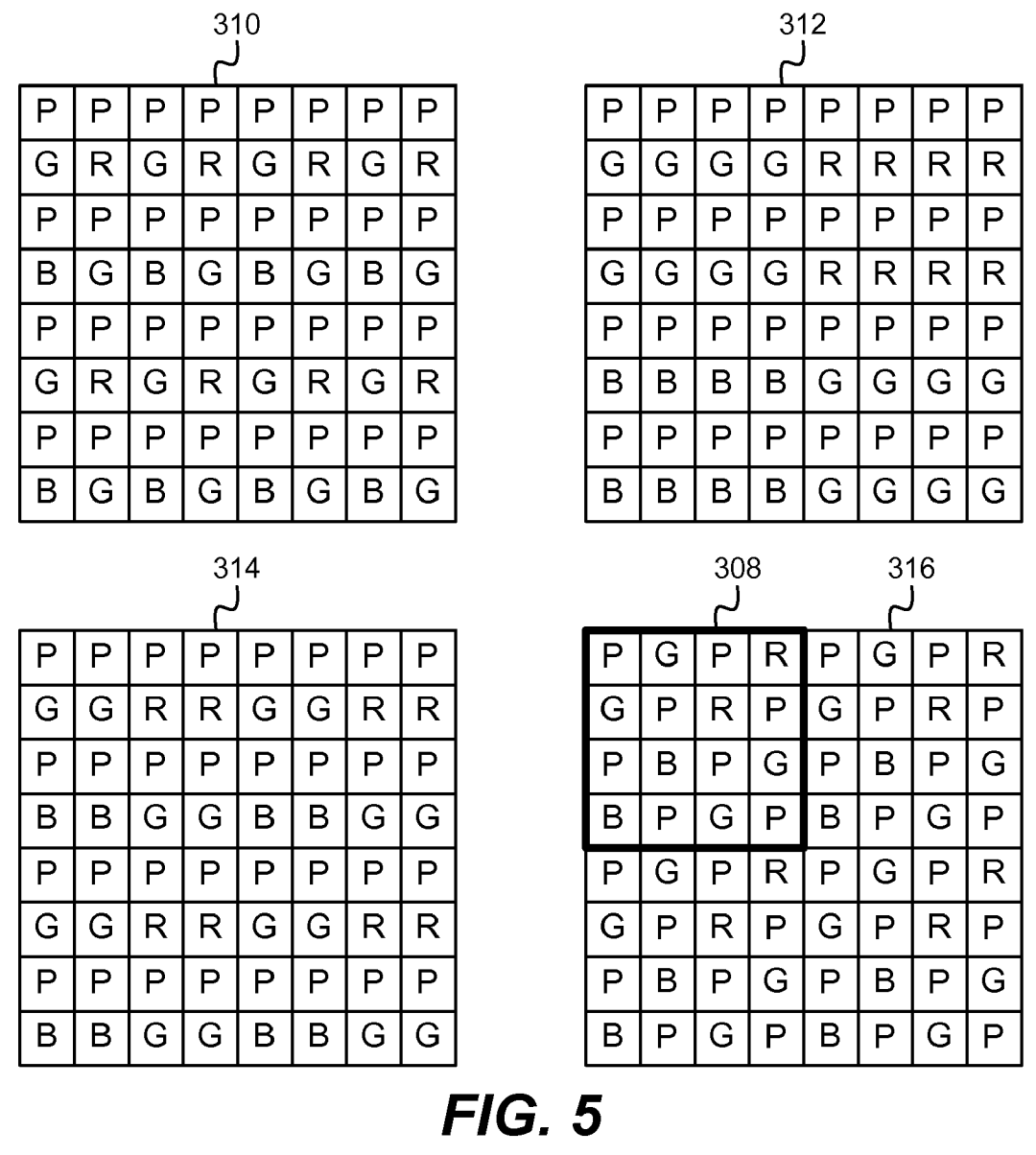
Figure 6:
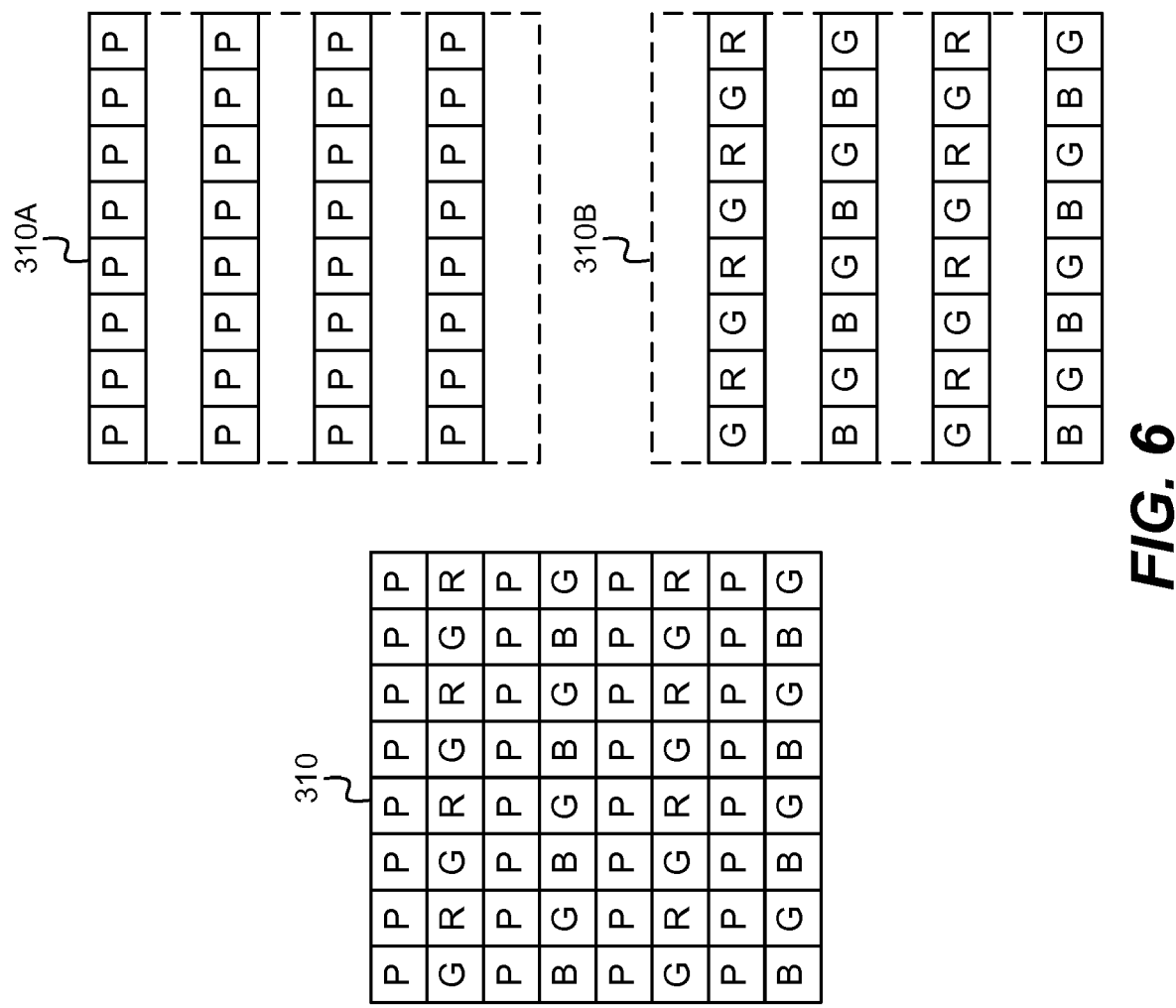
FIG. 6 is a plan view showing an example of components that form a partition of a pixel array.
Figure 8:
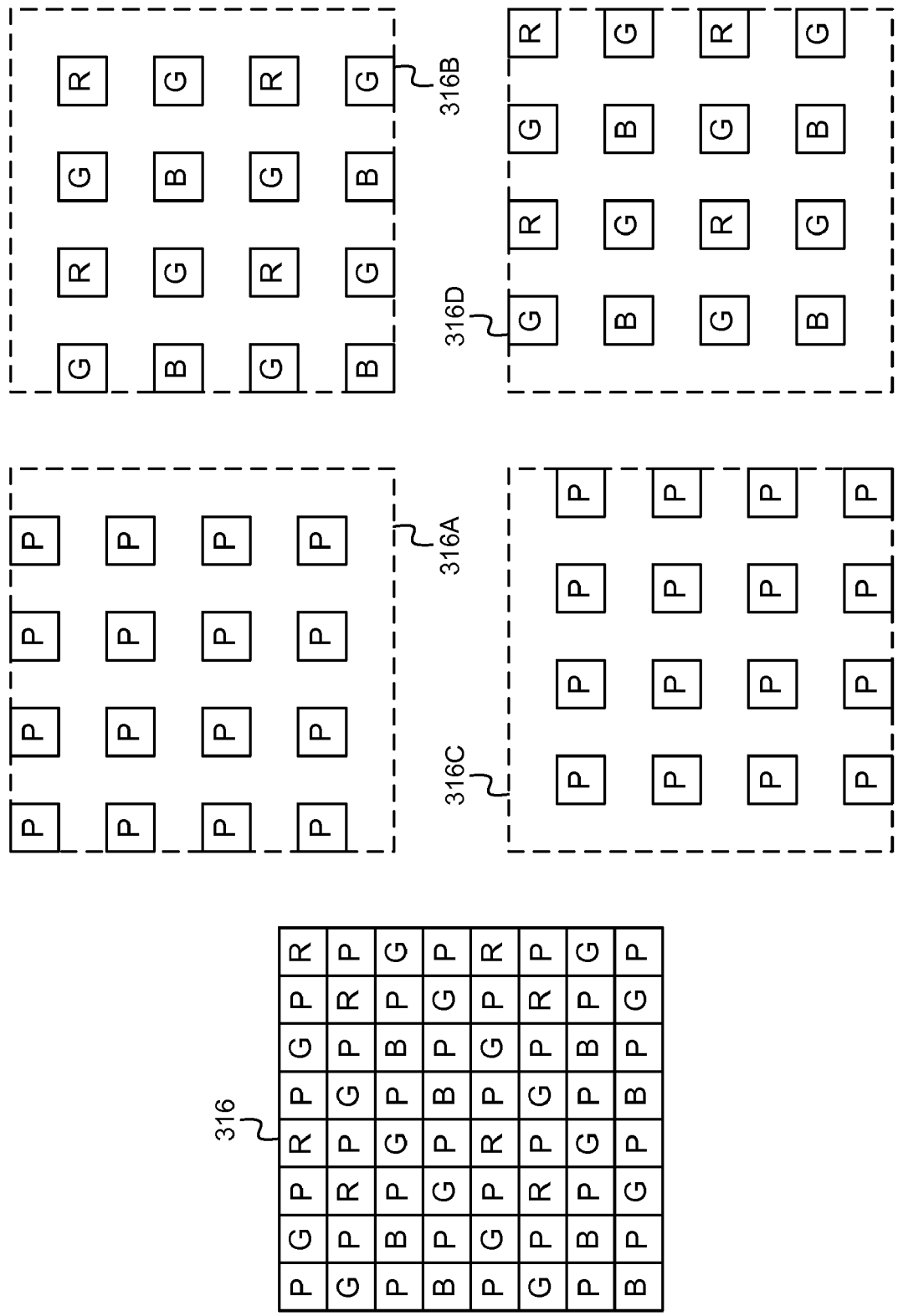
FIG. 8 is a plan view showing an example wherein four components form a partition of another pixel array.

Subsequent FIGS. 5, 6, and 8 show various pixel arrangements or patterns that can be used for an imaging sensor. Of course, it should be noted that the patterns shown for the full array and for any of its subsets in these figures represent pixel arrangements, patterns that can be repeated hundreds of times within a single sensor array.

FIG. 5 shows the use of a combination of panchromatic pixels, indicated P in the array patterns shown, with R, G, and B pixels in various patterns, labeled 310, 312, 314, and 316. A representative example of a minimal repeating unit for 316 is shown by the heavy outline 308. As can readily be appreciated, numerous patterns are possible, including those that use repeating units, as was described earlier with reference to FIG. 2. Pattern 310, for example, uses alternating rows of color RGB pixels, in an expansion of the Bayer pattern, with interleaved rows of panchromatic P pixels. In FIG. 6, this interleaved arrangement is shown more clearly as 310B and 310A representing the color RGB pixels and the panchromatic pixels, respectively.

FIG. 6 shows how one of the patterns 310 of FIG. 5 can be formed from two non-empty component subsets 310A and 310B. Significantly, component subsets are non-empty proper subsets and are disjoint, that is, their intersection is the empty set. Component subset 310A contains only panchromatic pixels; component subset 310*b* contains only color pixels (Bayer arrangement). Moreover, the union of component subsets 310A and 310B form the complete set of pixels represented by pattern 310. In terms familiar to those well versed in mathematical set theory, component subsets 310A and 310B can be said to form a partition of the set represented by pattern 310. In terms more familiar to those skilled in image processing, this separation into components effectively provides a sparse sampling of the rows and columns of pixels of the image sensor. Each component subset is sparsely sampled in at least one dimension, horizontally or vertically, so that each component subset captures different portions of a scene. A minimal repeating unit of this pattern is two columns by four rows.

In the context of the present invention, the term "component subset" as initially defined with reference to FIG. 6 may be simply shortened to "component" or, more generally, "subset" as a convenience. That is, 310A and 310B can be considered components of the array represented by pattern 310. Of course, for illustration, FIG. 6 shows only a small 8×8 portion of the full image array, which in practice may actually extend many hundreds of pixels in each direction. Components 310A and 310B would similarly extend over the full area of the sensor pixels.

Figure 7:
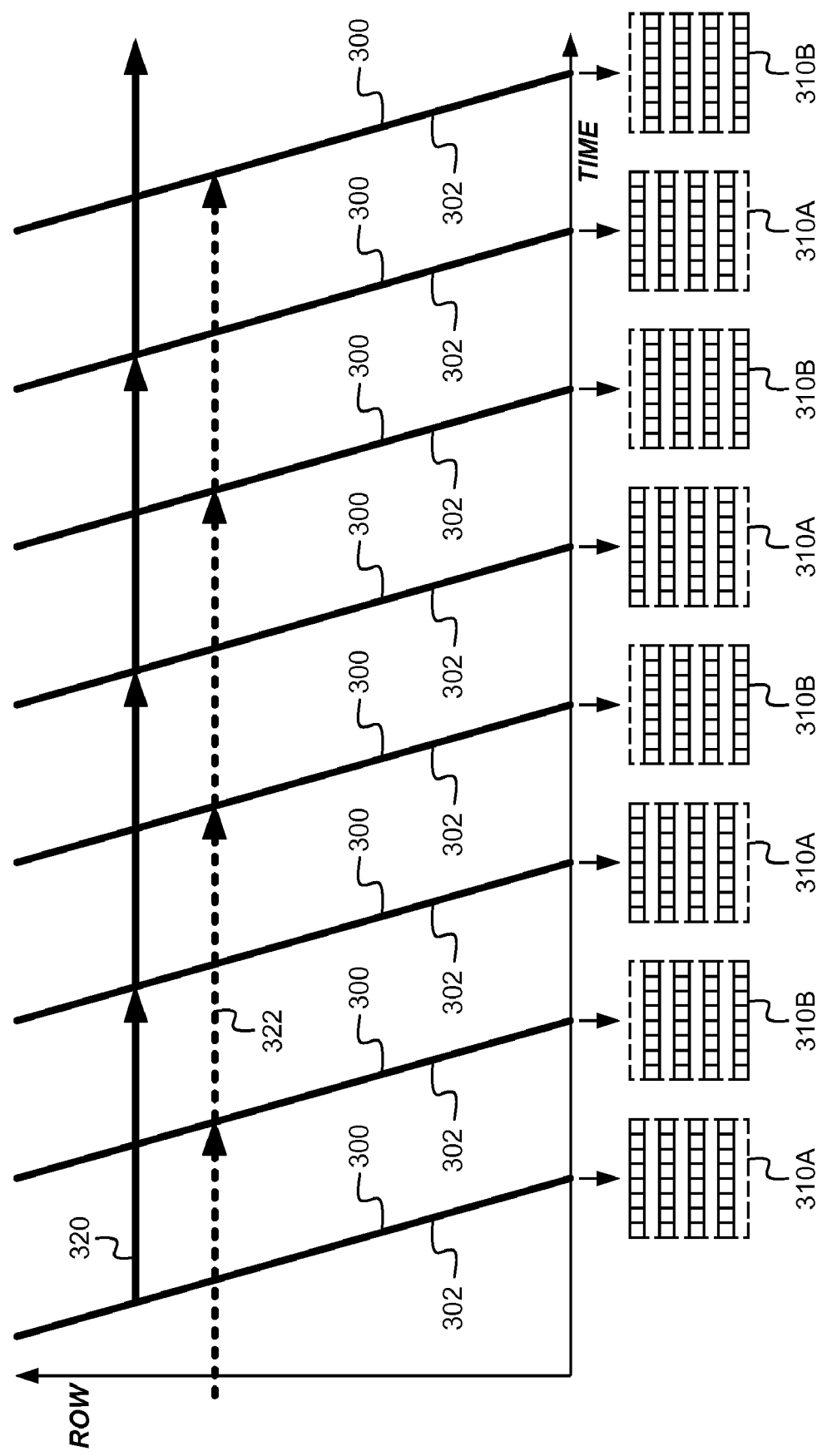
FIG. 7 is a timing diagram showing rolling shutter operation for panchromatic and color pixels in one embodiment.

Given pixel array patterns such as that shown in FIGS. 5 and 6, it can be most advantageous to perform separate reads of the two types of pixels, that is, reading the panchromatic P component and color RGB components separately. In one embodiment, a rolling shutter sequence reads each of the two types of pixels separated into components, color component 310B and panchromatic component 310A, with staggered timing. The timing diagram of FIG. 7 shows staggered rolling shutter mode timing that can be applied in one embodiment. Here, panchromatic pixels of panchromatic component 310A are read and reset with the rolling shutter timing represented by the upper line of bold arrows 320 (Pan). Color pixels of color component 310B are read and reset with the rolling shutter timing represented by the outlined arrows 322 (Color). Here, the integration and reset/read times for the panchromatic and color pixels overlap so that pixels of one component are exposed for at least a portion of the time that pixels of another component are read.

The staggered timing arrangement shown in FIG. 7 can be advantageous in simplifying the processing of image data from each pixel type. By providing concurrent and overlapping exposure and read/reset cycles, this timing sequence helps to utilize an image sensor having both panchromatic and color pixels more efficiently. Data access time can be reduced. It can also serve to reduce image shear effects, since motion, most readily detected using panchromatic pixels, can be detected at a faster sampling rate.

Specifically, FIG. 7 shows reading pixel charge to produce pixel signals from the first subset of the panchromatic pixels 310A while exposing the second subset of color pixels 310B during time interval 322 and digitizing and storing the first subset signals; and reading pixel charge to produce pixel signals from the second subset of color pixels 310B that were exposed for at least a portion of time 322 during the reading of pixel signals from the first subset of the panchromatic pixels 310A and digitizing and storing the second subset signals.

Pixels in the sensor array can be further segmented to yield additional advantages. Referring to FIG. 8, there is shown a partition of pattern 316 with component subsets 316A, 316B, 316C, and 316D. In the "checkerboard" arrangement of FIG. 8, component subsets 316A and 316C provide the panchromatic pixels P; component subsets 316B and 316D provide the color pixels R, G, B. The timing diagram of FIG. 9 shows how a rolling shutter sequence can be used to obtain a complete image having the full pattern 316 of FIG. 8 read out as component subsets 316A, 316B, 316C, and 316D.

Figure 9:
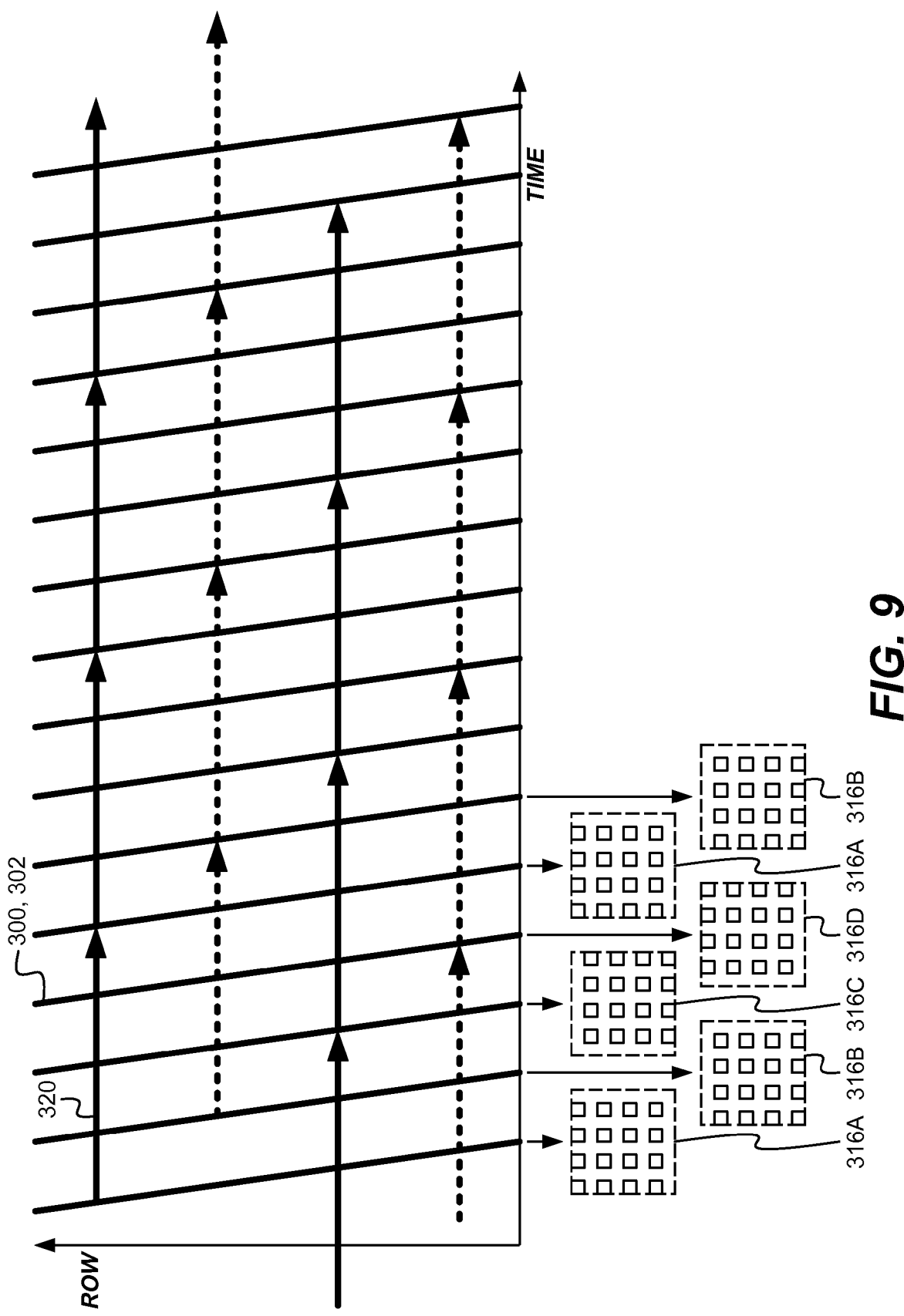
FIG. 9 is a timing diagram showing rolling shutter operation for reading four components corresponding to those shown in FIG. 8.

For the example of FIG. 8, as shown in corresponding timing diagram FIG. 9, panchromatic pixel reads 316A and 316C alternate between color reads 316B and 316D in this sequence. A cycle of four read/reset operations is needed to obtain the full image, represented by pattern 316. When compared with conventional rolling shutter read mode as described earlier with reference to FIG. 3B, the arrangement shown in FIG. 9 provides the same exposure time and the same set of pixels, but read out in an alternative manner.

Panchromatic components can include any one or more of conventional colors used for obtaining an image. In addition, a color component can be formed from a single color or two colors only. For example, in one embodiment, one of the Color scans obtains green (G) light only. The other Color scan obtains red and blue color data.

Figure 10:
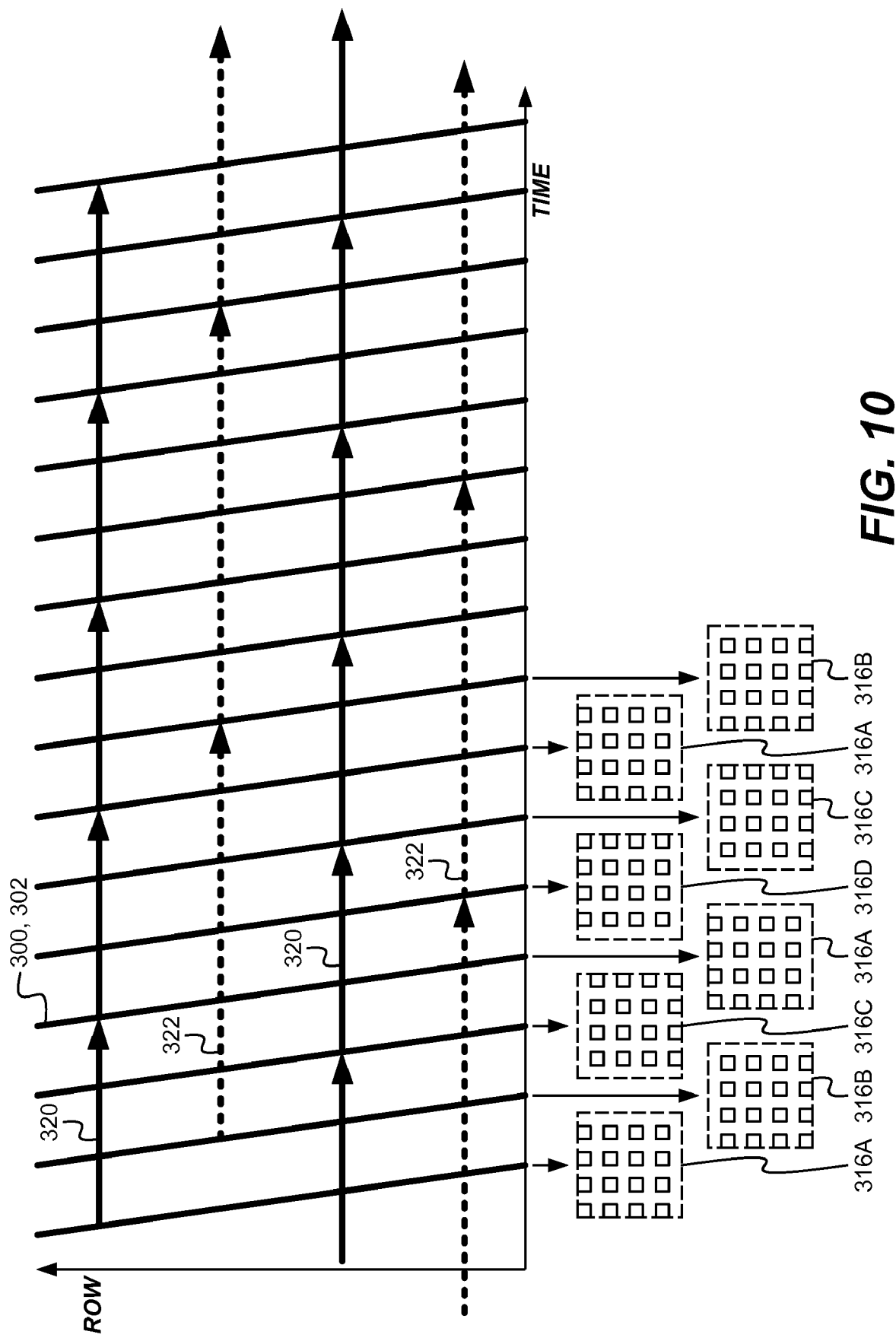
FIG. 10 is a timing diagram showing rolling shutter operation for reading four components, in which the color pixels are given an extended exposure time.

Referring back to the graph of FIG. 4, it is notable that the monochrome filtering provided for panchromatic pixels provides significantly improved efficiency of these pixels over their RGB color counterparts. Because of this, the panchromatic pixels can be given shorter exposure times, relative to color pixels, to obtain the same amount of light energy. With this relationship in mind, the staggered timing arrangement of FIG. 10 provides a sequence in which color pixel exposure times, as shown by the dotted arrows 322, are twice as long as the times provided for panchromatic pixels, as shown by the solid arrows 320. In every interval between color pixel reads (that is, between readout of component subsets 316B and 316D in FIG. 10), both panchromatic component subsets 316C and 316A are read out. The exposure time allotted for each color pixel is six read intervals; the exposure time for panchromatic pixels is only three read intervals. It can be appreciated that this timing sequence can be helpful in speed-balancing the panchromatic and color pixels. In addition, because the panchromatic pixels can be read more often, motion detection and compensation can be carried out more effectively, using panchromatic image data.

Figure 11:
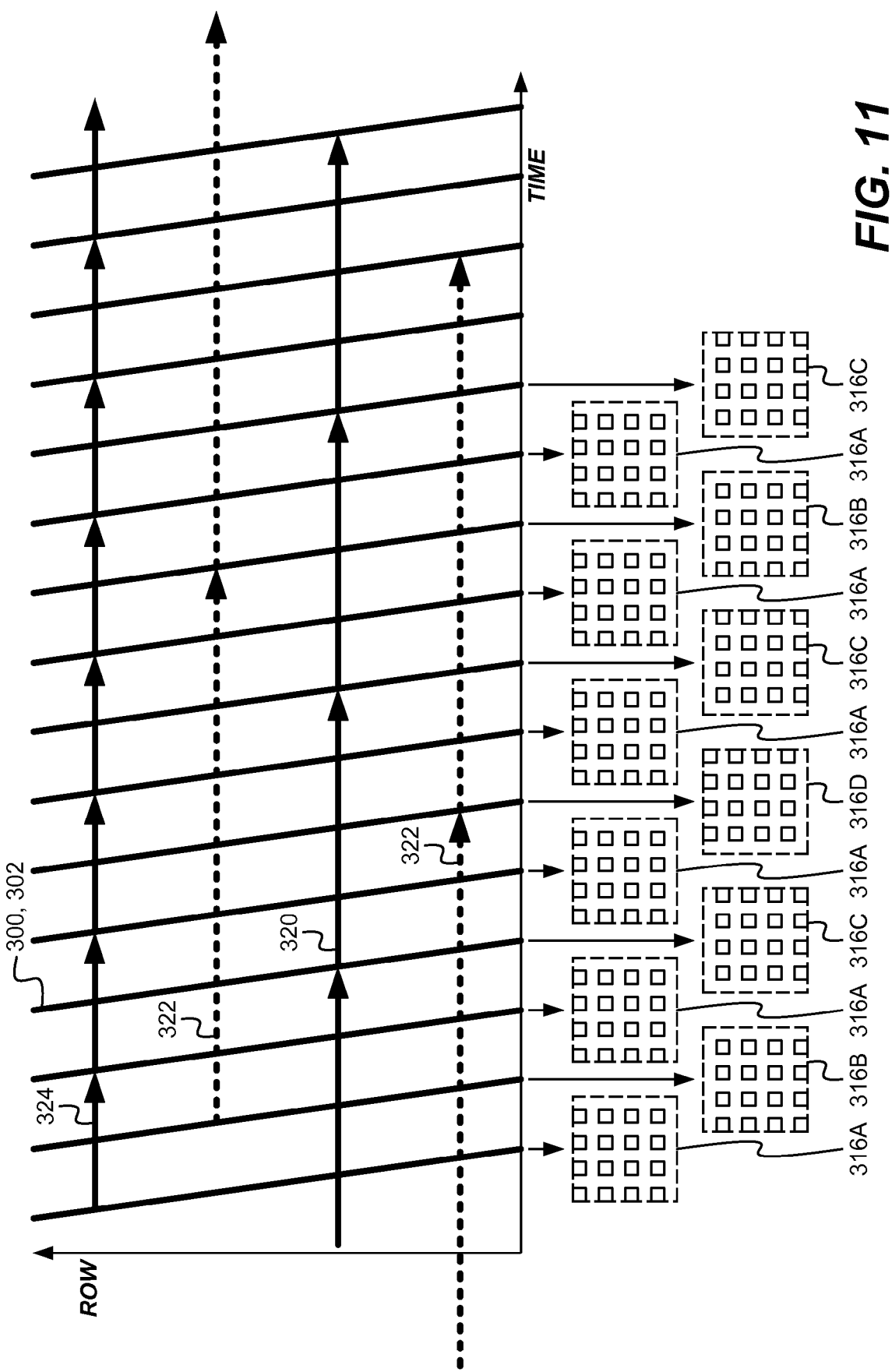
FIG. 11 is a timing diagram showing rolling shutter operation for reading four components, in which the color pixels are given an extended exposure time and panchromatic pixels are given two different shorter exposure times.

Other embodiments can take further advantage of changes in pixel speed. For example, the timing diagram of FIG. 11 shows an embodiment in which one component subset 316A of panchromatic pixels has a short integration time, shown by solid arrow 324, with a read/reset/exposure cycle over two read intervals. Another component subset 316C of panchromatic pixels has a longer integration time, shown by solid arrow 320, with a read/reset/exposure cycle over four read intervals. The component subsets 316B and 316D of color pixels have still longer integration times, shown by dotted arrows 322, with a read/reset/exposure cycle over eight read intervals.

In each of the timing examples shown in FIGS. 7, 9, 10, and 11, it is clear that each component is read out in a fraction of the time required to read all the pixels in order, as shown in FIGS. 3A and 3B. This is particularly advantageous for reducing certain motion related artifacts that arise due to relative motion between the operation of the rolling shutter and the scene being captured.

Although it is offers significant advantages when used with the rolling shutter readout mode, as described with reference to FIGS. 7-11, the arrangement of sensor pixels into components also has advantages for the alternate global transfer readout mode used with some types of CMOS and CCD sensor devices. As noted earlier, device circuitry that is used for global transfer must be provided with some type of light-shielded storage.

Figure 12:
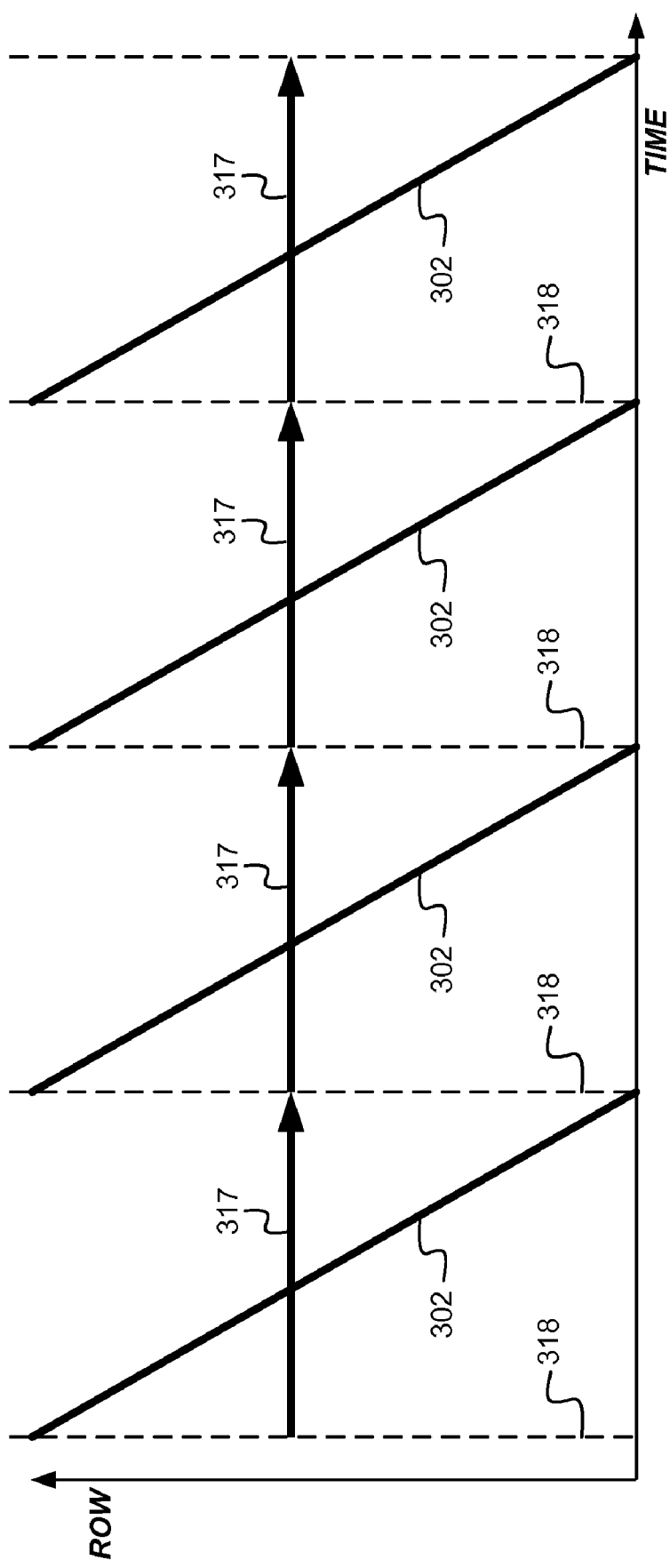
FIG. 12 (prior art) is a timing diagram showing global capture as conventionally carried out using an image sensor.

Referring to FIG. 12, there is shown the conventional timing sequence used for global transfer mode readout from a sensor. Charge is accumulated in the photosensitive areas of the sensor as indicated by the thick arrows 317 between the dashed lines 318. At the end of each exposure interval, the accumulated charge is transferred globally from the photosensitive areas of the pixel to light shielded storage areas. The global transfers are indicated by dashed lines 318. Readout of the transferred charges takes place row-by-row as indicated by the slanted lines 302. As shown, the exposure time is limited by the time required to read out all the rows. As someone skilled in the art is aware, the exposure time is allowed to be shorter than the time shown in FIG. 12 by adding a global reset step between global transfers 318.

Figure 13:
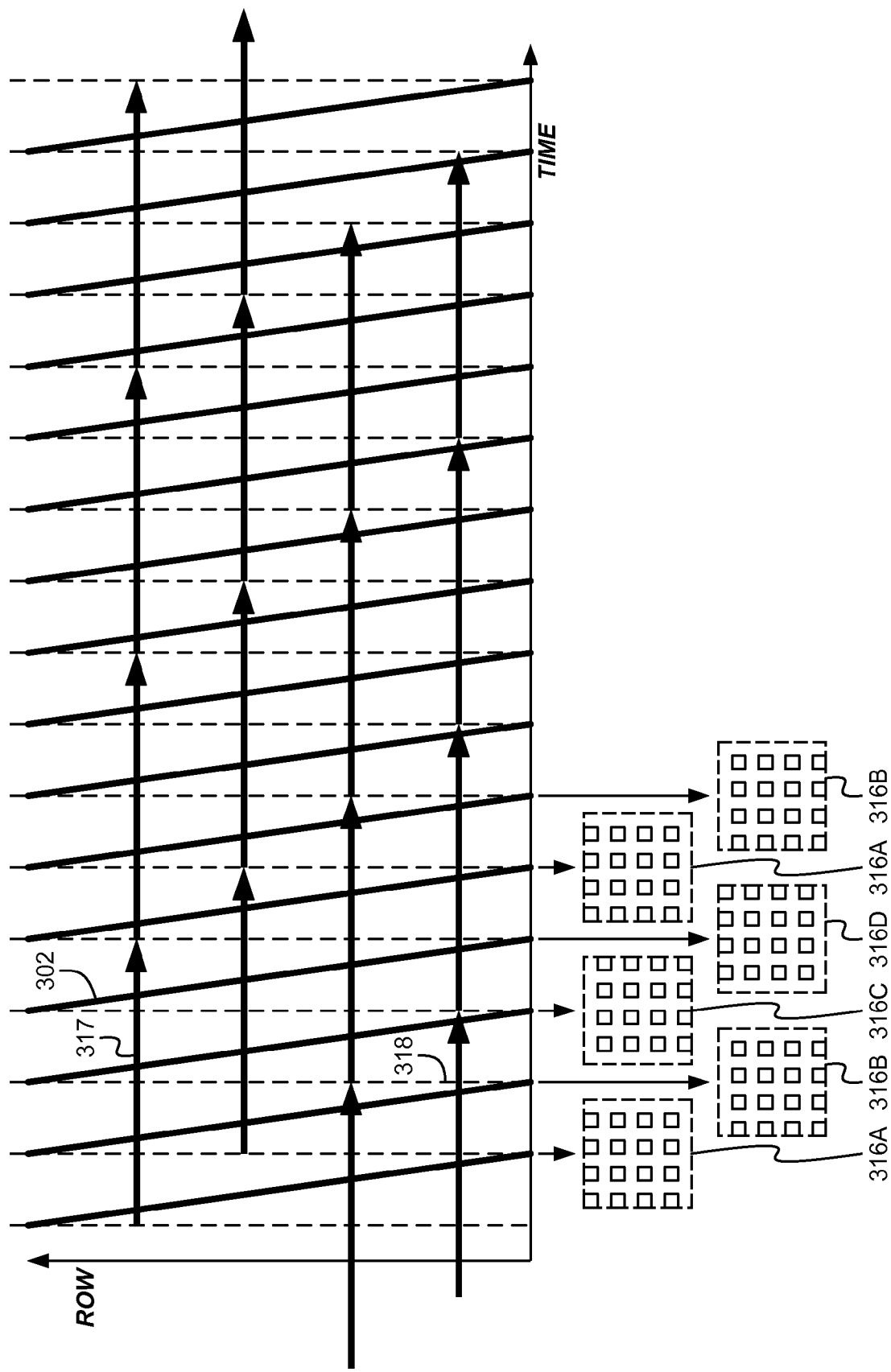
FIG. 13 is a timing diagram showing global capture operation with concurrent exposure and read operations using four components.

FIG. 13 illustrates an embodiment of the present invention that employs a form of global transfer. Comparing FIG. 13 to rolling shutter embodiment illustrated by FIG. 9, the readout of four component subsets is identical, but the integration times for each component begin and end globally at the vertical dashed lines 318. The exposure times for the four components are overlapped. The benefits for the global transfer embodiment are the same as the benefits for the rolling shutter embodiment, with the additional benefit that each component is free from motion shear as previously described. Furthermore, readout of components using global transfer can be achieved in an image sensor with shared readout structures such as interlaced vertical CCDs or shared floating diffusion in APS sensors.

Global transfer also permits different time periods to be used for different components, as was described earlier for embodiments using the rolling shutter timing sequence. By comparing to FIGS. 9, 10, and 11 to FIG. 13, global transfer embodiments of the present invention are readily recognized that have different exposure times between panchromatic and color components (analogous to FIG. 10), or different exposure times between individual panchromatic components (analogous to FIG. 11).

The organization of sensor 20 pixels into a partition having multiple components, where the components are read out separately and have overlapping exposure and readout timing as described herein, is effected in a number of ways. For optimization of some arrangements, appropriate readout circuitry in sensor 20 in sensor stage 28 (FIG. 1) is required. For example, appropriate readout circuitry in sensor 20 is required to allow the pixels of each component subset of the partition shown in FIG. 8 to be read out separately, using either the rolling shutter or global transfer methods described earlier.

A particularly useful readout circuitry arrangement for sensor 20 relates to charge binning, that is, combining the charge from two or more photosensitive areas during the readout process to provide a single signal for readout. Circuit arrangements that support binning for CMOS sensor arrays are described, for example, in commonly assigned U.S. Pat. No. 6,160,281 entitled Active Pixel Sensor with Inter-Pixel Function Sharing" to Guidash, which discloses a circuitry configuration in which a floating diffusion is shared as a common charge storage element between two or more pixels. For CCD image sensors, the charge from multiple pixels is binned, for example, in the vertical or horizontal CCDs or in the floating diffusion that is used for charge signal sensing.

Figure 14:
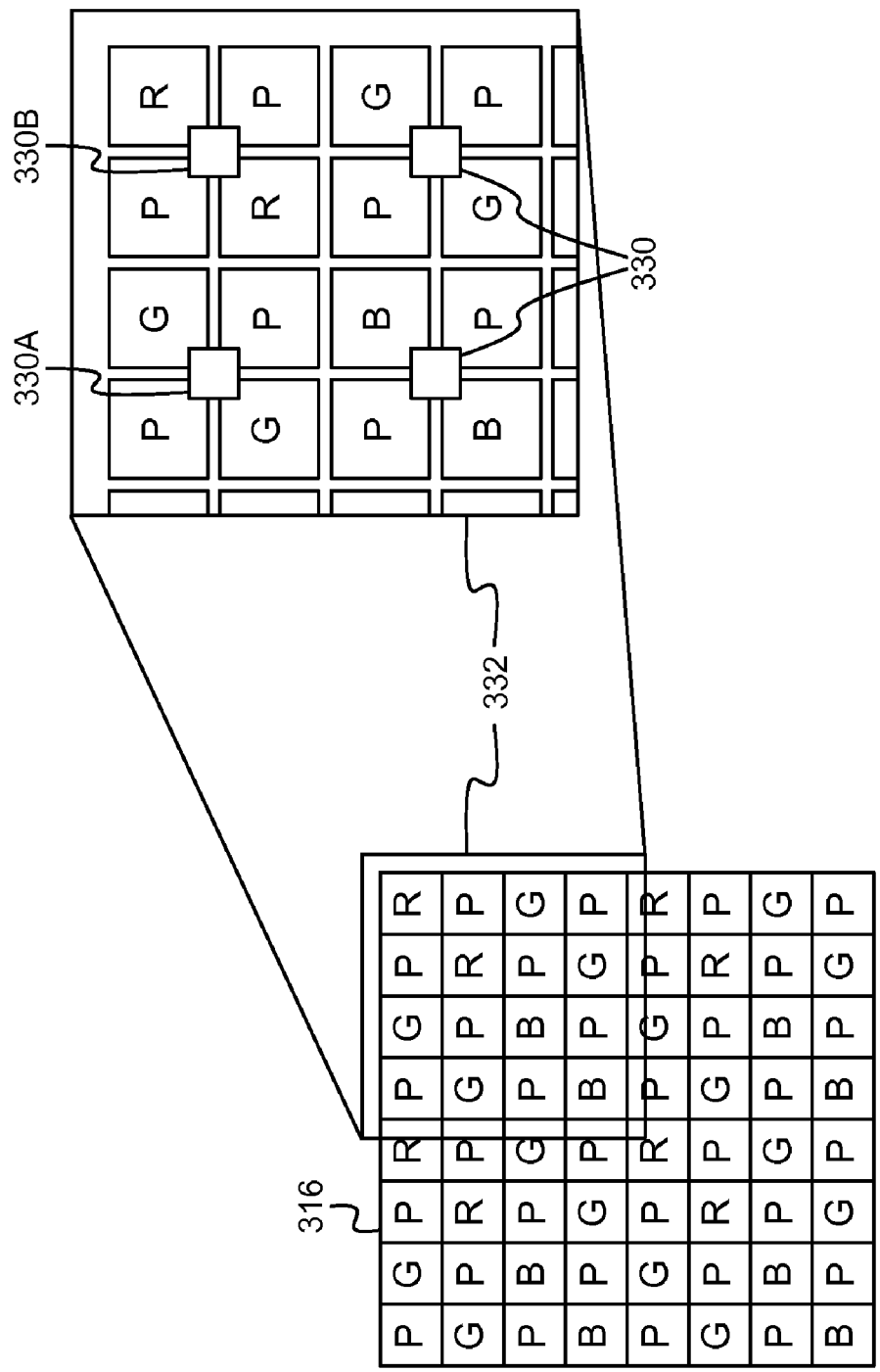
FIG. 14 is a plan view showing a pixel arrangement with shared or common charge storage elements.

Referring to FIG. 14, there is shown a simplified diagram showing a checkerboard pattern 316, as described earlier with reference to FIG. 8. An enlarged portion 332 shows a binning arrangement provided by the readout circuitry and a minimal repeating unit of the pattern 316 that aligns advantageously with the binning arrangement. Here, the pixels are arranged in groups of four pixels, with each group of four sharing a common floating diffusion or other temporary charge storage element 330. The signal charge from two or more of the four pixels that are arranged around each floating diffusion is selectively binned by transferring the charge from the pixels to the common floating diffusion; the binned charge is then read out. Significantly, each floating diffusion or other charge storage element 330A, 330B, and more generally, element 330, is shared by two panchromatic pixels (P) and two color pixels (R, G, or B), both of the same color. This arrangement of pixels with shared floating diffusions offers a number of advantages and is used flexibly in a number of different readout schemes as will be shown.

FIG. 15A shows a readout scheme for the common floating diffusion arrangement of FIG. 14 that provides a component 316A comprising the upper left panchromatic pixels P from each 2-by-2 group of four pixels that share a common floating diffusion 330 (FIG. 14). FIG. 15B shows an alternative readout scheme that provides a component 316E comprising the combined pair of like-color pixels R, G, or B from each 2-by-2 group of four pixels that share a common floating diffusion. FIG. 15C shows an alternative readout scheme that provides a component 316C comprising the lower right panchromatic pixels P from each 2-by-2 group of four pixels that share a common floating diffusion. The component subsets 316A, 316E, and 316C respectively of FIGS. 15A, 15B, and 15C represent a partition of pattern 316 into three component subsets, with two panchromatic component subsets and a color component subset. FIG. 15D shows an alternative readout scheme that provides a component 316F comprising the combined pair of panchromatic pixels P from each 2-by-2 group of four pixels that share a common floating diffusion. The component subsets 316E and 316F respectively of FIGS. 15B and 15D represent a partition of pattern 316 into two component subsets, with one panchromatic component subset and one color component subset. FIG. 15E shows an alternative readout scheme 316G in which the charge is combined from all four pixels in each 2-by-2 group of four pixels that share a common floating diffusion.

Figure 16:
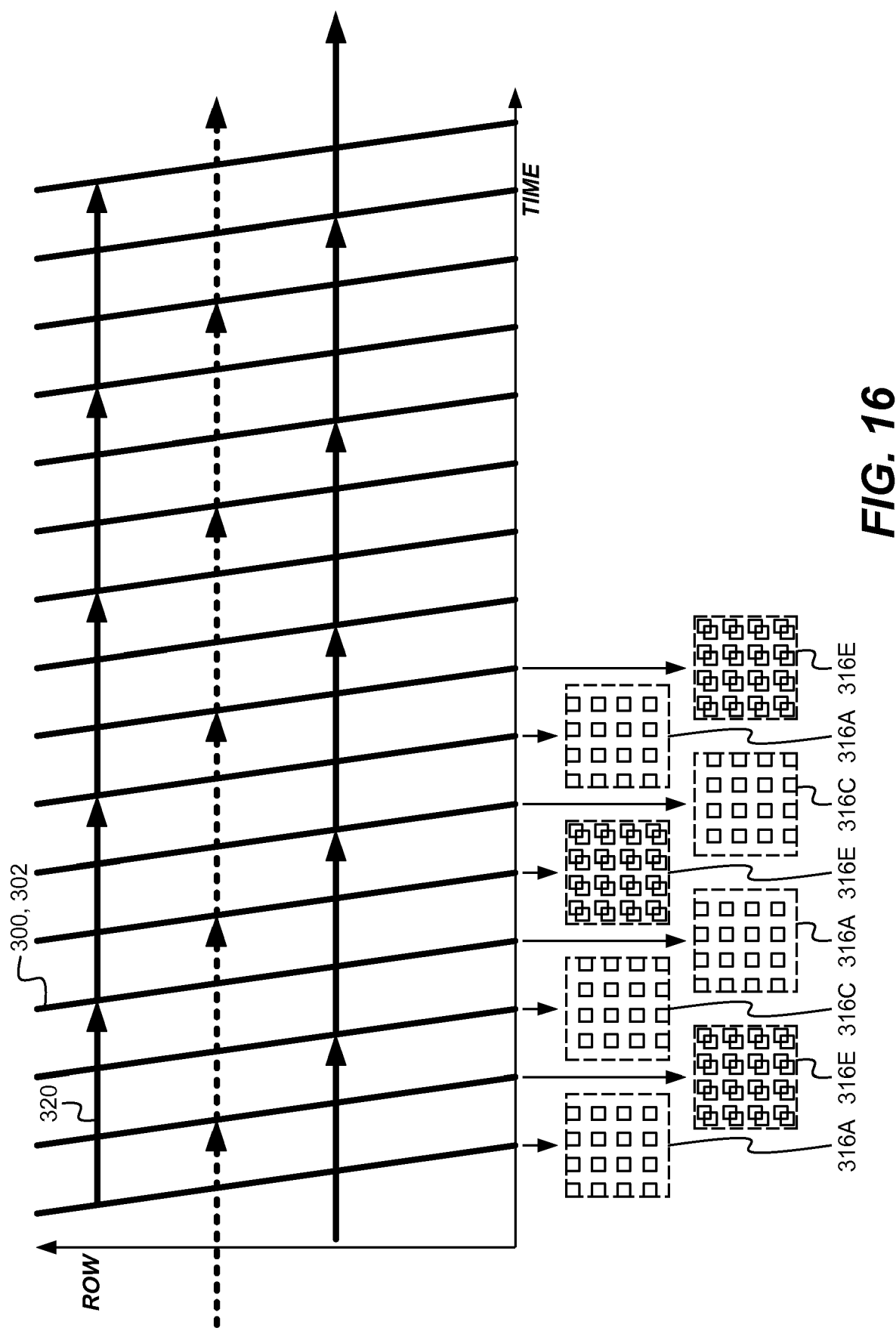
FIG. 16 is a timing diagram showing rolling shutter operation for reading three components in which one of the components includes binned pixels.

A timing scheme that benefits from the use of binning is the 3-component capture sequence shown in FIG. 16. This timing scheme uses component subsets 316A, 316E, and 316C shown respectively in FIGS. 15A, 15B, and 15C. In FIG. 16, the horizontal arrows 320 show integration times for pixels of individual components. The two rows of solid line arrows show integration times for components subsets 316A and 316C composed of panchromatic pixels; the row of dashed line arrows represents integration times for the component subset 316E comprising the color pixels binned pairwise as shown in FIG. 15B. Since the color pixels are binned pairwise while the panchromatic pixels are read out separately, some of the sensitivity deficit of the color pixels compared to the panchromatic pixels is overcome and a relative balance in photographic speed is achieved between the color and panchromatic component subsets. Furthermore, since only three component subsets are read out (as compared to the four components of FIG. 9), the time delay between two reads of the same component subset is reduced and opportunities for detection of motion details are improved.

Another timing scheme that benefits from the use of binning is the 2-component capture sequence shown in FIG. 17. This timing scheme uses component subsets 316E and 316F shown respectively in FIGS. 15B and 15D. In FIG. 17, the row of solid line arrows show integration times for component subset 316F composed of panchromatic pixels binned pairwise as shown in FIG. 15D; the row of dashed line arrows represents integration times for the component subset 316E comprising the color pixels binned pairwise as shown in FIG. 15B. Note that the output resolution of this timing scheme is ¼ the full resolution of the pixel array. Although the timing scheme of FIG. 17 does not have the photographic speed balance of FIG. 16 between color and panchromatic pixels, it does further reduce the time delay between two reads of the same component subset, further improving motion detail detection opportunities.

FIG. 16 and FIG. 17 show component readout arrangements with binned components in which the integration times of the components are equal, similar to the non-binned component readout of FIG. 9. By considering FIG. 10 and FIG. 11 in the context of binned components, it is clear that the present invention includes component readout arrangements with binned components in which the integration times of the components are not equal, or in which some components are read out more frequently than other components.

Further advantages are obtained from an adaptive component configuration that is able to change the composition or number of components of sensor 20 dynamically. Thus, for example, in a first partition arrangement that is optimized for low-light still imaging, sensor 20 has two components: one component comprising all of the panchromatic pixels binned pairwise as shown by FIG. 15D, the other component comprising all of the color pixels binned pairwise as shown by FIG. 15B. A second partition arrangement, selectable by the operator or automatically selected based on motion sensing, is optimized for motion imaging. In this second partition arrangement, sensor 20 has four components, such as those described with respect to FIGS. 8 and 9, for example.

In yet another embodiment, mode shifting is used. Global transfer mode is used for some types of imaging and rolling shutter mode is used for other types of imaging for the same digital camera or other image processing apparatus using the component arrangement of the present invention. A large number of variations are possible for adapting sensor 20 to different imaging conditions using a variable or dynamically changed component configuration and readout mode. Transition decisions between different component configurations or readout modes of the present invention depend on changing scene conditions and are made automatically by algorithms or are made by user selection.

Other alternate embodiments further segment one or more components and adjust reset and read timing accordingly. It can be appreciated that the method of the present invention can be used with any of a number of pixel arrangements for a sensor that includes both panchromatic and color pixels.

The present invention includes reading only a portion of the sensor (known commonly as windowing or region-of-interest), but partitioning and reading that portion using component subsets as disclosed herein.

It can be appreciated that the method and apparatus of the present invention can help to mitigate or overcome some of the inherent problems with a sensor that combines panchromatic pixels and color pixels. By segmenting the image sensor into multiple individual components and obtaining image data from one component at a time, the present invention permits panchromatic components to be read more often than color components while maintaining relative photographic speed balance between color and panchromatic pixels.

For moving images, the present invention helps to reduce motion shear and provides more accurate motion detection that can be used to help de-blur images. Because it provides image data from the entire scene that has been obtained at more frequent intervals than previously shown, the present invention provides more accurate data for motion estimation. With a reduced duty cycle, component-to-component displacement is reduced and the motion estimation and compensation task is simplified.

Because panchromatic pixels can be read out more frequently, one can take advantage of their inherently higher sensitivity by having shorter integration times. Signals from panchromatic pixels can also be processed more quickly than can color data.

Some pixels in the sensor array may not be assigned to a component when using the present invention. These may be imaging pixels, unused pixels, or non-imaging pixels used for sensing conditions for flash lighting, for example. Furthermore, the present invention does not require that all component subsets of a given partition be read out.

The invention has been described in detail with particular reference to certain preferred embodiments thereof, but it will be understood that variations and modifications are effected within the spirit and scope of the invention.

PARTS LIST

10 Light
11 Imaging stage
12 Lens
13 Filter block
14 Iris
16 Sensor block
18 Shutter block
20 Sensor
22 Analog signal processor
24 A/D converter
26 Timing generator
28 Sensor stage
30 Bus
32 DSP Memory
36 Digital signal processor
38 Processing Stage
40 Exposure controller
50 System controller
52 Bus
54 Program memory
56 System memory
57 Host interface
60 Memory card interface
62 Socket
64 Memory card
68 User interface
70 Viewfinder display
72 Exposure display
74 User inputs
76 Status display
80 Video encoder
82 Display controller
88 Image display
100 Block
102 Block
110 Filter Transmission Curve
112 Panchromatic Quantum Efficiency Curve
114 Red Quantum Efficiency Curve
116 Green Quantum Efficiency Curve
118 Blue Quantum Efficiency Curve
300 Reset operation
302 Read operation
308 Minimal repeating unit
310 Pixel pattern
310A Component subset
310B Component subset
312 Pixel pattern
314 Pixel pattern
316 Pixel pattern
316A Component subset
316B Component subset
316C Component subset
316D Component subset
316E Component subset
316F Component subset
316G Binned readout
317 Global transfer integration time
318 Global transfer
320 Panchromatic integration time
322 Color integration time
324 Panchromatic integration time
330 Shared storage element
330A Shared storage element
330B Shared storage element
332 Enlarged portion of pixel array

The invention claimed is:

1. A method for obtaining image data from an image sensor array comprising the steps of:
   a) providing an image sensor array having a first component subset of panchromatic pixels for integrating charge and a second component subset of color pixels for integrating charge, wherein each component subset is sparsely sampled and extends over a region of interest of the image sensor array;
   b) reading pixel charge to produce pixel signals from the first component subset of the panchromatic pixels while exposing the second component subset of color pixels and digitizing and storing the first component subset signals; and
   c) reading pixel charge to produce pixel signals from the second component subset of color pixels that were exposed for at least a portion of time during the reading of pixel signals from the first component subset of the panchromatic pixels and digitizing and storing the second component subset signals.

2. The method of claim 1 wherein the first component subset is completely read out prior to reading out the second component subset.

3. The method of claim 1 wherein there is at least one additional component subset of either panchromatic pixels or color pixels.

4. The method of claim 1 wherein a plurality of images of a scene is captured by the image sensor and, while a component subset of pixels is read out, the remaining component subsets of pixels are integrating charge.

5. The method of claim 1 wherein the image sensor array has panchromatic P, a first color R, a second color G, and a third color B pixels, and wherein the pixels are arranged with the following minimal repeating unit:
PGPR $$\begin{matrix} G & P & R & P \\ P & B & P & G \\ B & P & G & P \end{matrix}.$$

6. The method of claim 1 wherein the reading of pixel charge in both steps b) and c) includes simultaneously delivering and storing charge in separate floating diffusions for each pixel from a given component subset of pixels and serially reading out the corresponding pixel signals from the floating diffusions to produce the first and second component subset signals, respectively.

7. The method of claim 1 wherein the reading of pixel charge in both steps b) and c) includes simultaneously delivering and storing charge in separate charge-coupled devices for each pixel from a given component subset of pixels and serially reading out the corresponding pixel signals from the charge-coupled devices to produce the first and second component subset signals, respectively.

8. The method of claim 1 wherein reading out pixel charge in steps b) and c) is accomplished using an electronic rolling shutter sequence.

9. The method of claim 1 wherein the first component subset of pixels is exposed to light from the scene for a different length of time than the second component subset of pixels.

10. The method of claim 1 wherein the first component subset of pixels is exposed to light from the scene for a different length of time than the second component subset of pixels such that the first component subset of pixels is read out more frequently than the second component subset.

11. A method for obtaining image data from an image sensor array comprising the steps of:
  a) providing an image sensor array and selectively organizing the image pixels into a first organization of a first component subset of panchromatic pixels for integrating charge and a second component subset of color pixels for integrating charge and a second organization with a different first component subset of panchromatic pixels and a different second component subset of color pixels, wherein each component subset is sparsely sampled and extends over a region of interest of the image sensor array;
  b) reading pixel charge to produce pixel signals from the first component subset of the panchromatic pixels while exposing the second component subset of color pixels and digitizing and storing the first component subset signals;
  c) reading pixel charge to produce pixel signals from the second component subset of color pixels that were exposed for at least a portion of time during the reading of pixel signals from the first component subset of the panchromatic pixels and digitizing and storing the second component subset signals; and
  d) changing the organization of the image pixels in response to photographic conditions.

12. The method of claim 11 wherein photographic conditions include one or more of the following: light level, degree of motion, and focus setting.

13. The method of claim 11 wherein the relative timing of steps b) and c) is changed in accordance with photographic conditions.

* * * * *